United States Patent [19]

Ivers et al.

[11] Patent Number: 6,158,470

[45] Date of Patent: Dec. 12, 2000

[54] TWO-WAY MAGNETORHEOLOGICAL FLUID VALVE ASSEMBLY AND DEVICES UTILIZING SAME

[75] Inventors: Douglas E. Ivers; J. David Carlson, both of Cary; Mark R. Jolly, Holly Springs; Michael J. Chrzan, Apex, all of N.C.; Donald R. Prindle, North East, Pa.; Kenneth A. St. Clair, Cary, N.C.

[73] Assignee: Lord Corporation, Cary, N.C.

[21] Appl. No.: 09/502,998

[22] Filed: Feb. 11, 2000

Related U.S. Application Data

[62] Division of application No. 08/811,896, Mar. 5, 1997.

[51] Int. Cl.[7] .................................................. F16K 31/02
[52] U.S. Cl. ........................ 137/807; 137/827; 137/909; 251/129.01
[58] Field of Search ........................ 251/129.01; 137/909, 137/807, 806, 827, 829

[56] References Cited

U.S. PATENT DOCUMENTS

| | | |
|---|---|---|
| 2,661,596 | 12/1953 | Winslow . |
| 2,667,237 | 1/1954 | Rabinow . |

(List continued on next page.)

FOREIGN PATENT DOCUMENTS

| | | |
|---|---|---|
| 44 33 056 A1 | 3/1996 | Germany . |
| 60113711 | 6/1985 | Japan . |
| 62-106136 | 5/1987 | Japan . |
| 2 123 922 | 2/1984 | United Kingdom . |
| 2 267 947 | 12/1993 | United Kingdom . |
| WO 94/10692 | 5/1994 | WIPO . |
| WO 94/10693 | 5/1994 | WIPO . |
| WO 94/10694 | 5/1994 | WIPO . |
| WO 98/00653 | 1/1998 | WIPO . |

OTHER PUBLICATIONS

Duclos; "Design of Devices Using Electrorheological Fluids", Aug. 8–11, 1988; SAE Technical Paper No. 881134.

Miller, et al.; "The Design and Development of a Semi–Active Suspension for a Military Tank"; Aug. 8–11, 1988; SAE Technical Paper No. 881133, p. 2.

Kordonsky; "Adaptive Structures Based on Magnetorheological Fluids"; 1992; pp. 13–27.

Carlson, et al.; "Commercial Magneto–Rheological Fluid Devices"; Lord Corporation Brochure No. LL–8001, p. 6.

*Primary Examiner*—Kevin Lee
*Attorney, Agent, or Firm*—Wayne W. Rupert; Randall S. Wayland

[57] ABSTRACT

A controllable valve assembly (18) applicable in Magnetorheological (MR) fluid devices (20), such as MR mounts and MR dampers. The valve assembly (18) includes a valve body (32) having a magnetic circuit (40) contained therein which carries magnetic flux $\phi$, a controllable passageway (42) within the magnetic circuit (40), a MR (magnetically controlled) fluid (44) including soft-magnetic particles in a liquid carrier contained in the controllable passageway (42), a magnetic flux generator, such as a wound wire coil (46), generating magnetic flux $\phi$ which is directed through the MR fluid (44) in the controllable passageway (42) thereby generating "rheology" changes causing restriction in flow of MR fluid (44) therethrough. In one aspect, a one-way check valve (34) is operative with a passive passageway (36) which is arranged in parallel relationship to the controllable passageway (42) provides "asymmetric" damping across the controllable valve (18) creating higher pressure differentials in a first direction and a lower in a second direction without "rapidly switching" the current to the coil (46). In another aspect, "asymmetric" damping is provided by a "changeable gap" formed by a moveable wall portion of the controllable passageway (42). In a third aspect, a first controllable passageway provides controllable flow in a first direction and a second controllable passageway provides controllable flow in a second direction, thereby provide "asymmetry." In a fourth aspect, "asymmetry" is provides by a "variable magnetic short" which changes magnetic circuit reluctance dependent on flow direction.

3 Claims, 12 Drawing Sheets

U.S. PATENT DOCUMENTS

| | | |
|---|---|---|
| 2,752,149 | 6/1956 | Forcellini . |
| 2,820,471 | 1/1958 | Crowell . |
| 2,846,028 | 8/1958 | Gunther . |
| 3,059,915 | 10/1962 | Kemelhor . |
| 3,174,587 | 3/1965 | Walton . |
| 3,807,678 | 4/1974 | Karnopp et al. . |
| 3,819,060 | 6/1974 | Kendall et al. . |
| 3,968,862 | 7/1976 | Gorges et al. . |
| 4,064,977 | 12/1977 | Taylor . |
| 4,351,515 | 9/1982 | Yoshida . |
| 4,733,758 | 3/1988 | Duclos et al. . |
| 4,775,038 | 10/1988 | Unnikrishnan et al. . |
| 4,792,127 | 12/1988 | Körtgen . |
| 4,958,704 | 9/1990 | Leiber et al. . |
| 5,018,606 | 5/1991 | Carlson . |
| 5,029,677 | 7/1991 | Mitsui . |
| 5,150,775 | 9/1992 | Charles et al. . |
| 5,158,109 | 10/1992 | Hare, Sr. . |
| 5,170,866 | 12/1992 | Ghaem . |
| 5,190,073 | 3/1993 | Vogt ................................. 137/807 X |
| 5,207,774 | 5/1993 | Wolfe et al. . |
| 5,241,991 | 9/1993 | Iorio et al. . |
| 5,249,652 | 10/1993 | Leitzman et al. . |
| 5,259,487 | 11/1993 | Petek . |
| 5,276,622 | 1/1994 | Miller et al. . |
| 5,277,281 | 1/1994 | Carlson et al. . |
| 5,284,330 | 2/1994 | Carlson et al. . |
| 5,325,942 | 7/1994 | Groves et al. . |
| 5,332,069 | 7/1994 | Murakami . |
| 5,353,839 | 10/1994 | Kordonsky et al. . |
| 5,353,897 | 10/1994 | Woessner . |
| 5,362,027 | 11/1994 | Champaigne et al. . |
| 5,390,121 | 2/1995 | Wolfe . |
| 5,398,917 | 3/1995 | Carlson et al. . |
| 5,452,745 | 9/1995 | Kordonsky et al. .................... 137/807 |
| 5,492,312 | 2/1996 | Carlson . |
| 5,495,923 | 3/1996 | Bruski et al. . |
| 5,522,481 | 6/1996 | Wantabe . |
| 5,547,049 | 8/1996 | Weiss et al. . |
| 5,578,238 | 11/1996 | Weiss et al. . |
| 5,588,509 | 12/1996 | WeiTzenhof et al. . |
| 5,652,704 | 7/1997 | Catanzarite . |
| 5,711,746 | 1/1998 | Carlson . |
| 5,712,783 | 1/1998 | Catanzarite . |
| 5,816,372 | 10/1998 | Carslon et al. . |
| 5,842,547 | 12/1998 | Carlson et al. . |
| 5,878,851 | 3/1999 | Carlson et al. . |
| 6,044,858 | 4/2000 | Nathanson ............................. 137/827 |

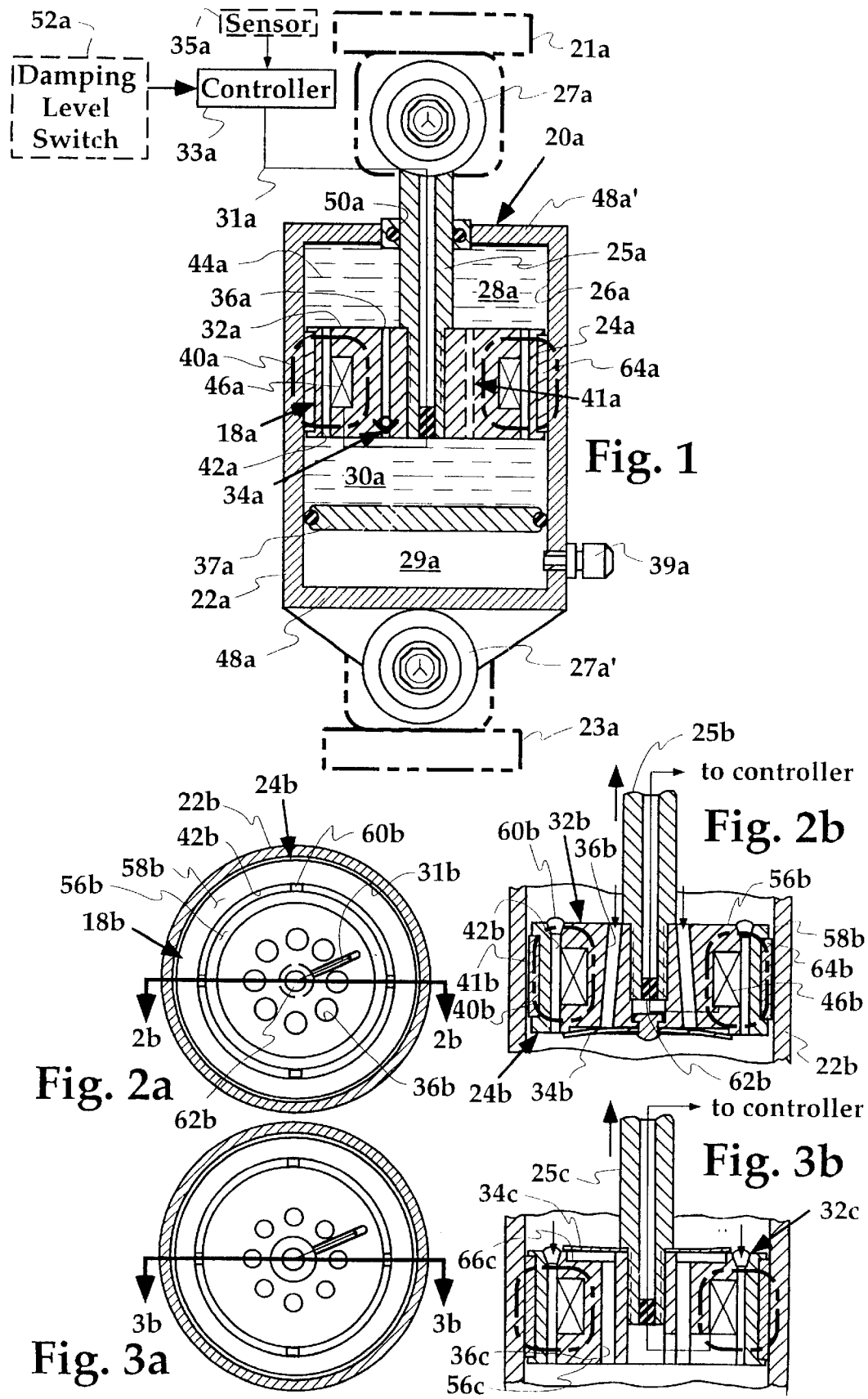

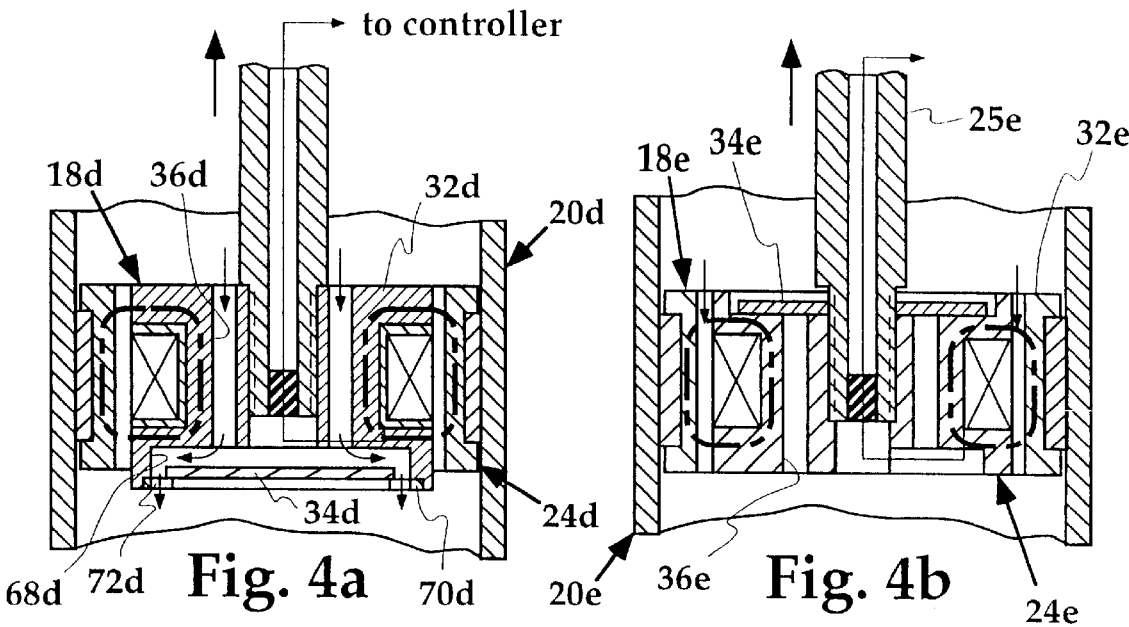
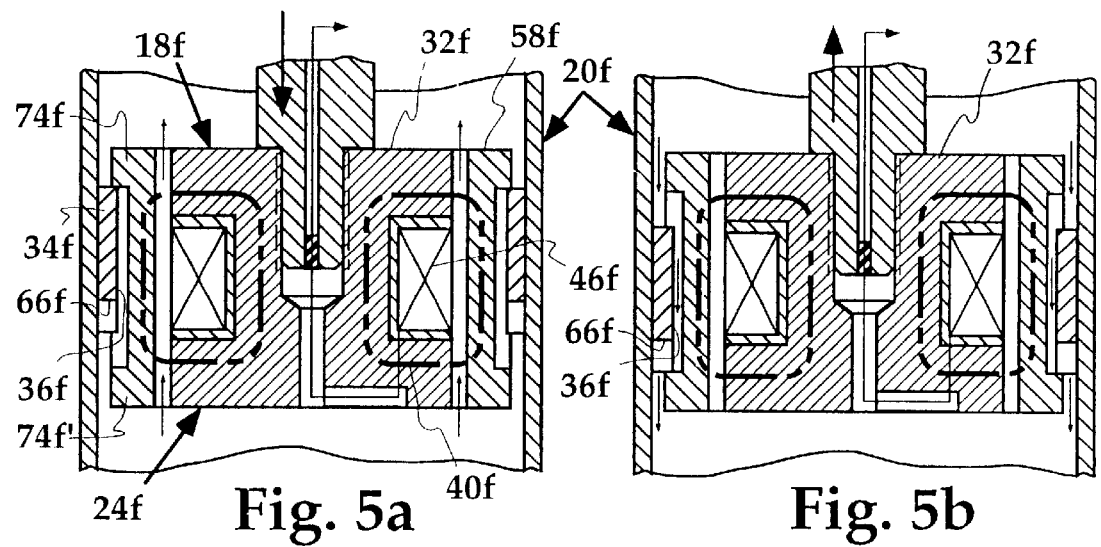
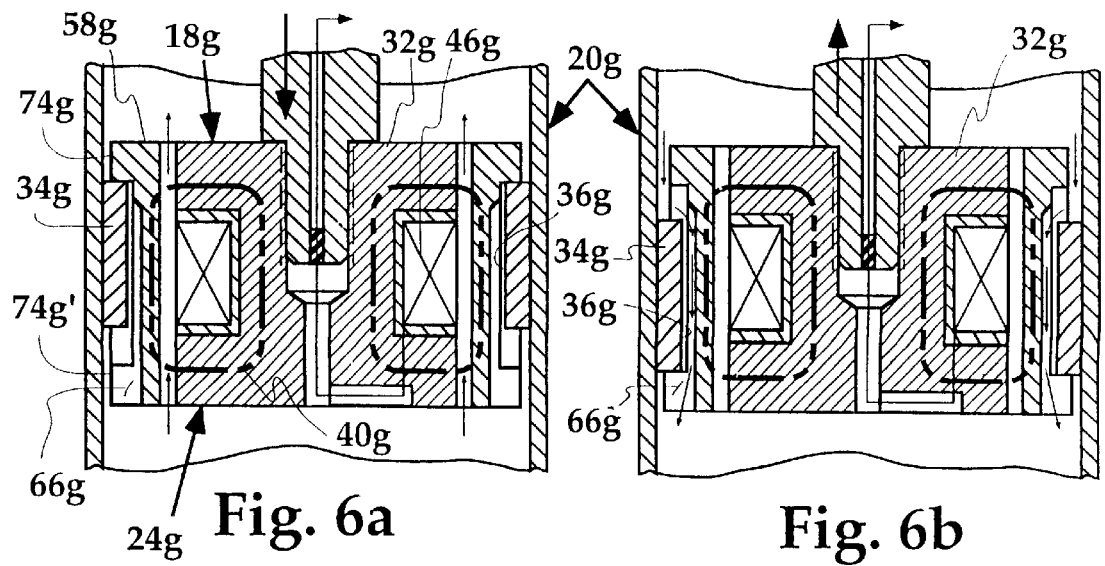

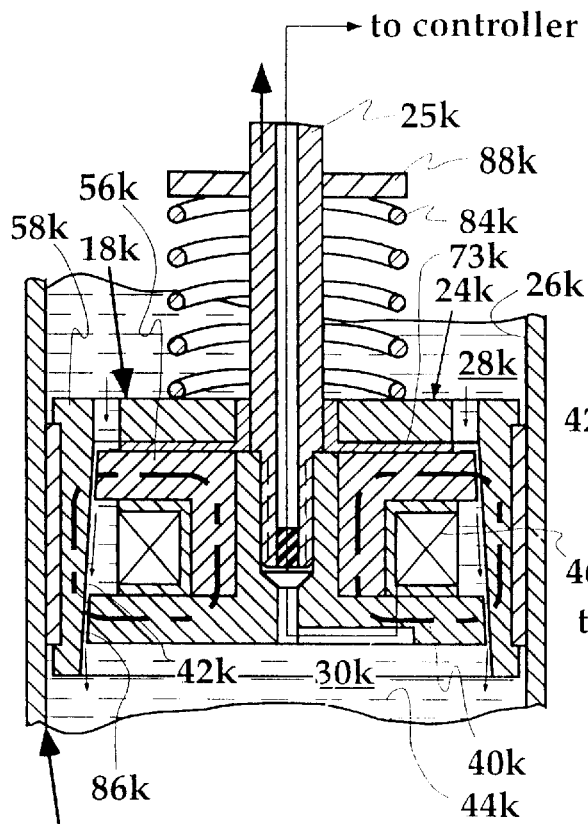
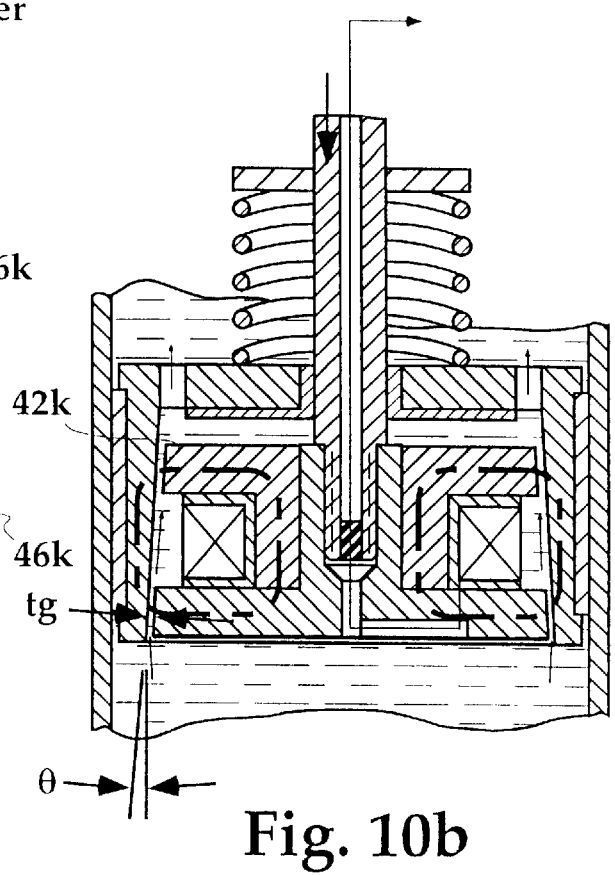
Fig. 10a  Fig. 10b
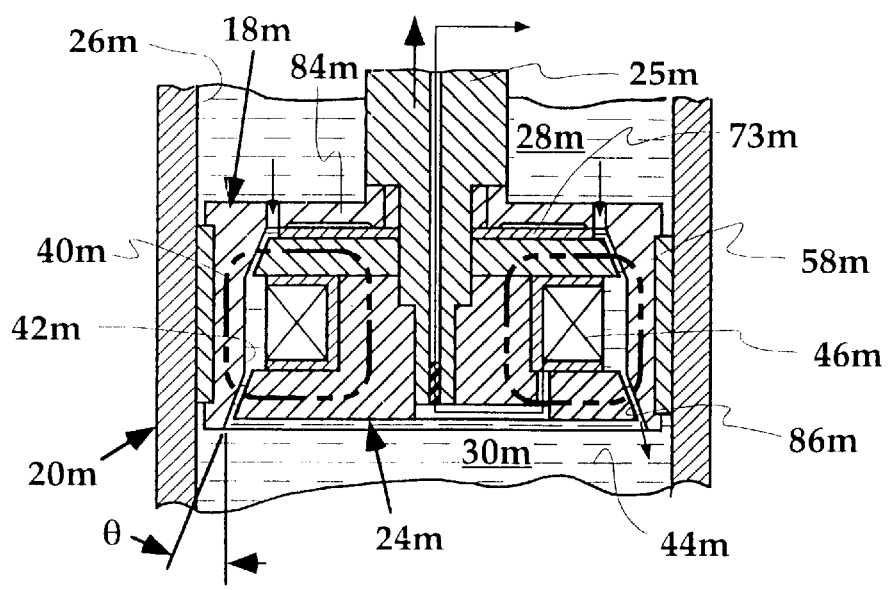
Fig. 11

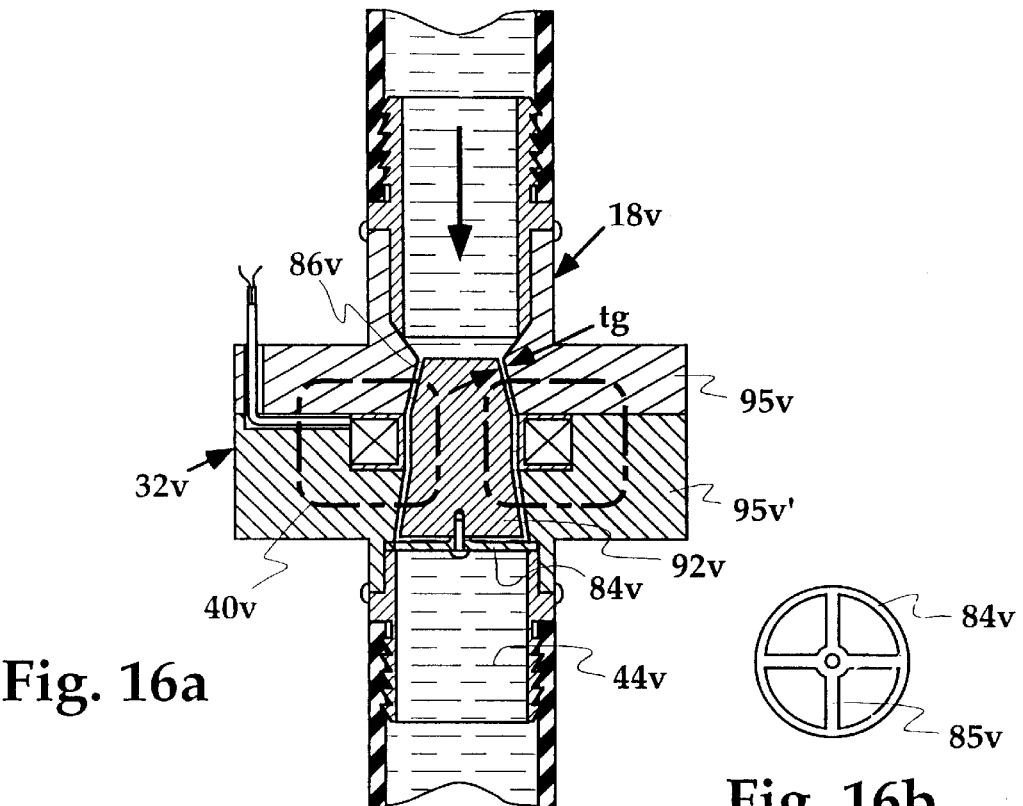
Fig. 16a
Fig. 16b
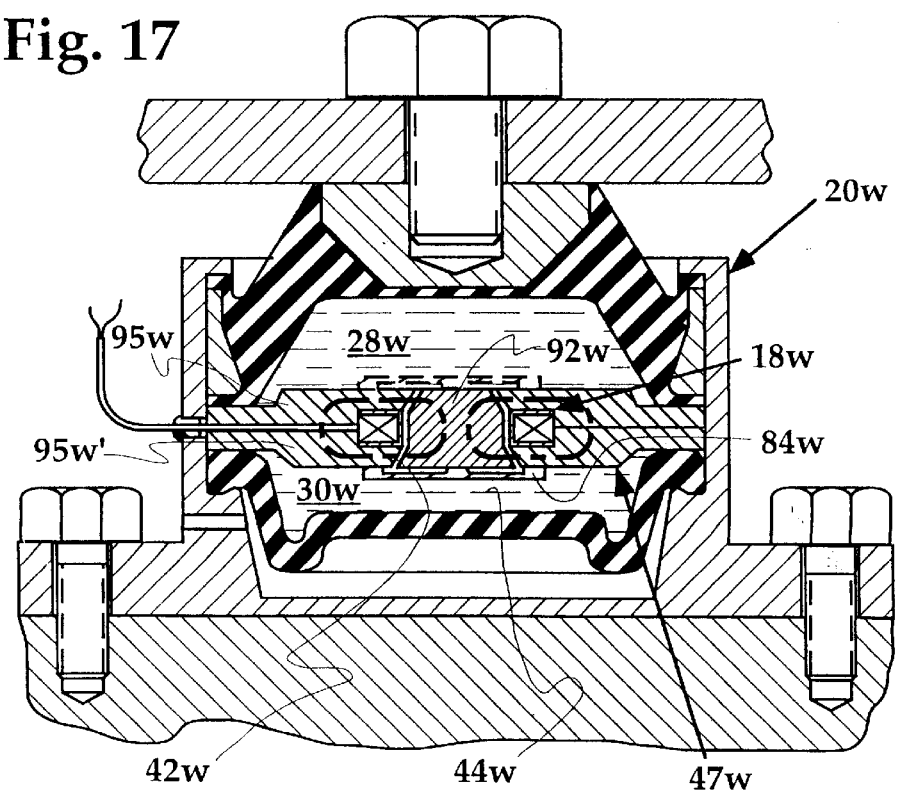
Fig. 17

TWO-WAY MAGNETORHEOLOGICAL FLUID VALVE ASSEMBLY AND DEVICES UTILIZING SAME

This application is a divisional of pending U.S. patent application Ser. No. 08/811,896, filed Mar. 5, 1997.

FIELD OF THE INVENTION

This invention relates to the area of controllable fluid valves and devices. Specifically, it relates to controllable fluid valves and devices which utilize a magnetorheological (magnetically controllable) fluid therein.

BACKGROUND OF THE INVENTION

Dampers and mounts are known which use a hydraulic fluid as the working medium to create damping forces/torques and to control motion, shock, and/or vibration. One special class of these devices are controllable. In particular, controllable mounts and dampers are known which include Electrorheological fluid (ER), Electrophoretic fluid (EP), Magnetorheological fluid (MR), and Hydraulic fluid (Semi-active), etc. Examples of ER-type mounts and dampers may be found in U.S. Pat. No. 4,733,758 to Duclos et al. and U.S. Pat. No. 5,029,677 to Mitsui. Further discussions of ER devices may be found in SAE 881134 entitled "Design of Devices Using Electrorheological Fluids" by T. Duclos. Descriptions of EP-type dampers may be found in U.S. Pat. No. 5,018,606 to J. D. Carlson. Examples of Semi-Active hydraulic dampers and valves may be found in U.S. Pat. No. 3,807,678 to Karnopp et al. and U.S. Pat. No. 5,207,774 to Wolfe et al.

Of particular interest are Magnetorheological (MR) fluid devices (hereinafter MR devices), as they only require small electrical currents (typically several amps or less) and do not present the potential shock hazard that ER devices do, because they operate on much lower voltage (typically 12 volts or less). MR devices employ a controllable Magnetorheological (MR) fluid comprised of small soft-magnetic particles dispersed within a liquid carrier. Typical particles include carbonyl iron, or the like, having various shapes, but which are preferably spherical, and which exhibit mean dimensions of between about 0.1 $\mu$m to 500 $\mu$m, and more preferably between about 1 $\mu$m and 100 $\mu$m. The carrier fluids include various known hydraulic oils, and the like. These MR fluids exhibit a thickening behavior (a rheology change), sometimes referred to as an "apparent viscosity change", upon being exposed to a magnetic field of sufficient strength. The higher the magnetic field strength to which the MR fluid is exposed, the higher the differential pressure (flow restriction or damping force) that can be achieved within the particular MR device (ex. MR damper, MR mounting).

Examples of prior art fluids can be found in WO 94/10694, WO 94/10693, and WO 94/10692, the inventions of which are commonly assigned to the assignee of the present invention. In particular, MR fluid devices provide ease of controllability through simple user selected fluctuations in the electrical current supplied to the magnetic field generator (generally a wound-wire coil) in the device. Notably, MR fluids and devices have demonstrated durability yet unobtained with ER devices (which exhibit a change in rheology upon being exposed to "electric" fields). Further, MR devices provide simplicity previously unachieved with controllable Semi-active devices, in that the controllable valves have few or no moving parts.

Descriptions of prior art MR devices can be found in U.S. application Ser. No. 08/304,005 entitled "Magnetorheological Fluid Devices and Process of Controlling Force in Exercise Equipment Utilizing Same", U.S. Ser. No. 08/613,704 entitled "Portable Controllable Fluid Rehabilitation Devices", U.S. Ser. No. 08/674,371 entitled "Controllable Brake", U.S. Ser. No. 08/674,179 entitled "Controllable Vibration Apparatus" and U.S. Pat. Nos. 5,547,049, 5,492,312, 5,398,917, 5,284,330, and 5,277,281, all of which are commonly assigned to the assignee of the present invention. Notably, these MR devices provide user-variable/selectable control forces or torques and describe such devices as MR mounts, MR dampers, and MR brakes.

Notably, the MR fluid valves (hereinafter MR valve) described in the prior art devices such as MR dampers, MR mounts, and the like, lack the ability to tune the output characteristics of the device/apparatus without some "rapid" control thereof. In other words, they require "rapidly switching" electronics in order to provide "asymmetric" damping in the various directions. For example, different damping characteristics in compression and extension are achieved in the prior art by applying one current in the compression direction and then rapidly switching to a second current in extension.

SUMMARY OF THE INVENTION

In light of the advantages and drawbacks of prior art MR devices, the present invention is a controllable valve assembly of the MR variety which is particularly useful for application in MR mountings and MR linear dampers, for passively producing "asymmetrical" damping in the various operating directions. For example, the "asymmetry" may take the form of different damping rates in the "compression" and "extension" directions. In a point of novelty, this "asymmetrical" feature is achieved via various "passive" means, therefore, eliminating the need to "rapidly switch" the current applied to the valve assembly, as required in prior art MR devices thereby dramatically simplifying electronic control needs.

In a first novel aspect, the "asymmetrical" damping characteristic is achieved by implementing a "changeable flow gap" within the controllable passageway which is exposed to magnetic field by implementing a moveable wall portion of a magnetic return member which moves relative to another portion of the valve body. Preferably, the magnetic circuit is oriented such that magnetic body forces on the magnetic return are minimized. This "changeable gap" dimension of the controllable passageway is variable as a function of flow direction. The "changeable gap" may be achieved by spring-loading of the wall portion of the controllable MR passageway, such that the gap widens or narrows as a function of flow direction, thereby changing the reluctance of the magnetic circuit and, resultantly, changing the damping characteristics of the particular valve or device by changing the magnetic field strength acting upon the magnetically controlled fluid contained within the MR controllable passageway.

In a second novel aspect, the "asymmetrical" damping characteristic is achieved by providing a "separate passive passageway" including a "one-way check valve" operative therewith. The passive passageway is located in parallel relationship to the MR controllable passageway and provides the means for preferably substantially restricting flow through the passive passageway in a first flow direction, yet allowing substantial flow in a second flow direction. This provides differing damping properties in the first and second flow directions, thereby eliminating the need to "rapidly switch" the controllable passageway to achieve the asymmetrical damping properties, as was required in prior art MR devices. The one-way check valve mechanism may take the form of a flexure, a floating disc, a slideable annular member, a spring-loaded poppet, a reed valve, a ball valve, or the like. Preferably, the passive passageway is situated "outside" the magnetic circuit such that the passive passageway is not exposed to any substantial amount of magnetic flux. However, the passive passageway may be situated "within" the magnetic circuit, if the dimensions of the passive passageway are such that they are substantially larger than comparable dimensions of the controllable passageway, such that a localized zone of lower magnetic field strength is achieved adjacent to the passive passageway, which resultantly minimizes any rheology change within the passive passageway.

In a third novel aspect, the "asymmetrical" damping characteristic is achieved by providing a "first controllable passageway" which preferably includes a one-way check valve operative therewith, for only allowing MR controllable flow in a first flow direction, and a "second controllable passageway" preferably including a one-way check valve operative therewith, for only allowing controllable flow in a second flow direction. Preferably, the magnetic circuits associated with the first and second controllable passageways provide different magnetic reluctances. This provides "asymmetrical" damping properties in the first and second flow directions, thereby eliminating the need to rapidly switch the current applied to the controllable passageways. Notably, the magnetic fields may be generated with a single or dual coils.

In a fourth novel aspect, the "asymmetrical" damping characteristic is achieved by providing a controllable passageway which includes a "directionsensitive pole piece" which slides axially within limits to form a magnetic circuit with "changeable magnetic reluctance", which varies as a function of flow direction through the controllable passageway. This provides different damping properties in the first and second flow directions, thereby eliminating the need to rapidly switch electrical current.

It is an advantage of the present invention controllable MR valve assembly when used in any controllable MR device, such as a MR mounting or MR damper, that "asymmetrical" damping forces may be obtained entirely passively.

It is another advantage when the controllable MR valve assembly is used in a controllable MR damper or MR mounting that higher damping forces may be obtained in one direction (ex. extension) and lower forces in the other direction (ex. compression) without having to "rapidly switch" the current, thereby minimizing control needs as compared to prior art MR devices.

The abovementioned and further features, advantages, and characteristics of the present invention will become apparent from the accompanying descriptions of the preferred embodiments and attached drawings.

BRIEF DESCRIPTION OF THE DRAWINGS

The accompanying drawings which form a part of the specification, illustrate several key embodiments of the present invention. The drawings and description together, serve to fully explain the invention. In the drawings, FIG. 1 illustrates a partial cross-sectioned side view of a controllable apparatus, such as a MR linear damper including a controllable MR valve assembly therein, FIG. 2a and FIG. 2b illustrate bottom, and cross-sectioned side views, respectively, of a piston assembly of an embodiment of MR linear damper which includes a controllable valve assembly with a flexure-type one-way check valve, FIG. 3a and FIG. 3b illustrate bottom, and cross-sectioned side views, respectively, of another controllable valve assembly with a flexure-type one-way check valve, FIG. 4a and FIG. 4b illustrate cross-sectioned side views of two different piston assemblies within MR linear dampers which each include controllable valve assemblies with floating-disc one-way check valves, FIG. 5a–5b and FIG. 6a–6b illustrate cross-sectioned side views of piston assemblies of MR linear dampers which include controllable valve assemblies with a slideable annular member acting as a one-way check valve, FIG. 10a and FIG. 10b illustrate cross-sectioned side views of a piston assembly of MR linear damper which includes a controllable valve assembly with a wall portion that is moveable to provide a changeable gap and wherein FIG. 10a shows the minimum gap position while FIG. 10b shows the maximum gap configuration, FIG. 11 illustrates a cross-sectioned side view of a piston assembly of MR linear damper which includes a controllable valve assembly with the moveable wall portion being spring-loaded by a flexure, FIG. 12a and FIG. 12b illustrates cross-sectioned side views of a single tube MR damper, and the piston assembly therefor, respectively, which includes a ball-type one-way check valve, and a plurality of coils acting as magnetic field generators for a plurality of controllable passageways, FIG. 16a illustrates a cross-sectional side view of another controllable MR valve assembly which includes a moveable wall portion, FIG. 16b illustrates a bottom view of a flexure which flexibly supports the magnetic return, FIG. 17 illustrates a cross-sectional side view of a MR fluid mounting which includes a moveable wall portion within the controllable passageway.

DETAILED DESCRIPTION OF THE PREFERRED EMBODIMENTS

Figures 7A, 7B:
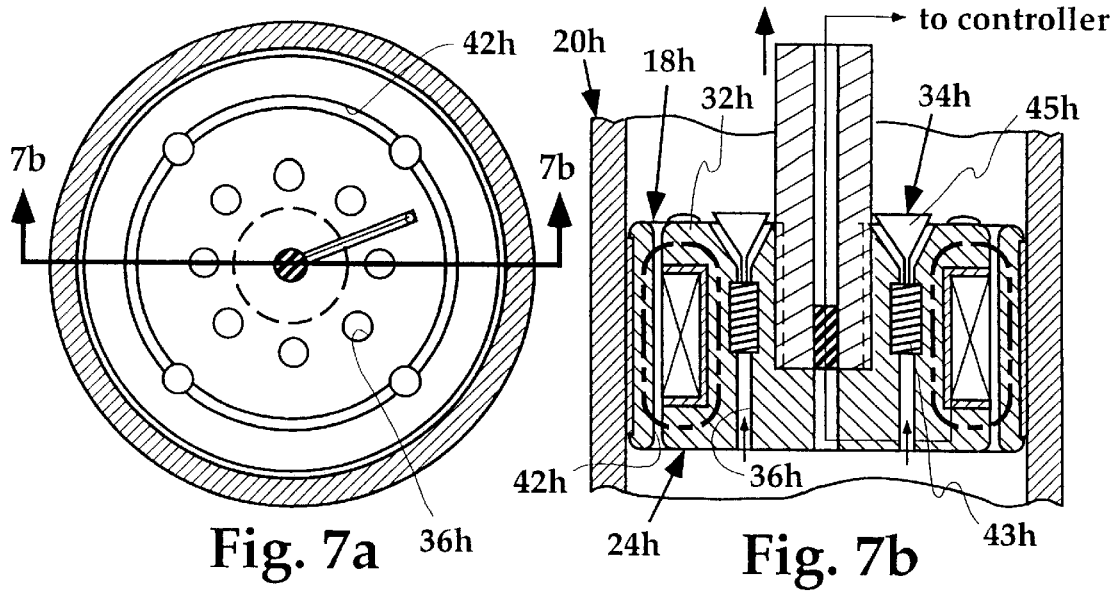
FIG. 7a and FIG. 7b illustrate bottom, and cross-sectioned side views, respectively, of a piston assembly of MR linear damper including a controllable valve assembly with a plurality of poppet-type one-way check valve.

Referring now to the Drawings where like numerals denote like elements, in FIG. 1, shown generally at 20a, is a first embodiment of a MR device which includes the present invention MR valve 18a and which illustrates conceptually, the preferred elements contained therein. This embodiment of MR device 20a is a linear-acting MR damper, and includes a housing 22a having a generally cylindrical shape and a first closed end 48a, an aperture 50a formed through a second end 48a' which is generally opposed to the first closed end 48a, and which includes an internal cavity 26a located therein. A piston assembly 24a is slidably received within the internal cavity 26a and subdivides the internal cavity 26a into first and second chambers 28a, 30a, between which, the working MR fluid flows. A piston rod 25a is secured to said piston 24a and is slidably, and preferably sealingly, received within said aperture 50a. The aperture 50a preferably includes a bearing and seal assembly, as is known to those of skill in the art. Further descriptions of such bearings and seals may be found in U.S. application Ser. No. 08/674,179 to Carlson et al. entitled "Controllable Vibration Apparatus." General descriptions of MR linear dampers may be found in commonly assigned U.S. Pat. No. 5,277,281 to J. D. Carlson entitled "Magnetorheological Fluid Dampers" and U.S. Pat. No. 5,284,330 to J. D. Carlson et al. entitled "Magntorheological Fluid Devices."

The means for attaching the piston rod 25a to the first member 21a, such as a vehicle seat or chassis, includes rod end 27a and appropriate fasteners. Likewise, the means for attaching the housing 22a to the second member 23a, such as a chassis or moveable suspension member, comprises rod end 27a' and appropriate fasteners. The rod ends 27a, 27a' may include elastomer or other friction-reduced motion-accommodating assemblies, such as ball or pin joints. A valve body 32a within the piston 24a contains at least a portion of the magnetic circuit 40a. A magnetic circuit 40a is capable of carrying a magnetic flux $\phi$ (a representative approximate flux line is labeled as the magnetic circuit 40a as will be the case with all embodiments described herein). It should be recognized that a substantial portion of the magnetic flux $\phi$ is carried within the magnetic circuit 40a.

A controllable passageway 42a is located adjacent to the valve body 32a and in the vicinity of the magnetic circuit 40a. Preferably, the controllable passageway 42a passes "through" the valve body 32a and is annular shaped. However, it may pass "about" the valve body 32a, as is known to those of skill in the art. Such valves where the controllable passageway passes "about" the piston assembly are described in U.S. Pat. No. 5,277,281 to J. D. Carlson et al. The controllable passageway 42a is capable of user-controllable flow or programmed (via a computer algorithm) flow. The working MR fluid 44a is contained within, and preferably substantially fills, the controllable passageway 42a, the first chamber 28a, and the second chamber 30a. The MR fluid 44a contains soft-magnetic particles dispersed in a liquid carrier of preferably low viscosity. One such fluid is described in U.S. Pat. No. 5,578,238 to Weiss et al. entitled "Magnetorheological Materials Utilizing Surface Modified Particles."

A magnetic flux generator, preferably a coil 46a, is manufactured from a magnet wire circumferenitially wound about a cylindrical bobbin. The coil 46a is preferably located within, and supported by, the valve body 32a and generates a magnetic flux $\phi$ which is then carried by the magnetic circuit 40a. The magnetic flux is directed by pole piece portions of the valve body 32a to act upon the MR fluid 44a contained in the controllable passageway 42a to provide user controllable flow. In other words energizing the coil 46a with electrical current (preferably DC) will create a magnetic field within the magnetic circuit 40a which will cause a "rheology" change, i.e., an alignment of the soft-magnetic particles in the MR fluid 44a in the controllable passageway 42a. The result is a restriction of flow through the controllable passageway 42a. Notably, the MR fluid 44a located elsewhere, such as in chambers 28a, 30a is not exposed to any significant magnetic field and does not undergo a rheology change.

In this first aspect, the means for providing "asymmetry" is provided by a passive passageway 36a which is preferably arranged in parallel relationship to the controllable passageway 42a. The passive passageway 36a includes a one-way check valve 34a operative therewith. The check valve 34a may be situated at the ends of the passive passageway, or in-between, so as to allow substantial flow of MR fluid 44a in a first flow direction associated with movement of the piston 24a in a first linear direction (example: compression) and substantially restrict flow of the fluid 44a in a second flow direction associated with movement of the piston 24a in a second linear direction (example: extension). Functionally, the one-way check valve 34a acts as a bypass in one direction, allowing a substantially portion of the MR fluid 44a to bypass the controllable valve 42a. Preferably, the cross-sectional area of the passive passageway 36a will be greater than that of the controllable passageway 42a. Notably, if a DC bias is applied to the coil 46a, substantially all flow of MR fluid 44a will be through the bypass, as the fluid 44a in the controllable passageway 42a will be generally "locked up." Although, shown with the one-way check valve 34a making damping in extension higher, in some applications, it may be desirable to reverse the check valve 34a, such that the compression stroke achieves higher damping.

In one variation of the present invention, the passive passageway 36a is located in a position which is "outside" of the magnetic circuit 40a, such that the MR fluid 44a passing through said passive passageway 36a is not exposed to any "substantial" amount of said magnetic flux $\phi$ i.e., magnetic field strength. The passive passageway 36a may either pass through the valve body 32a, or, alternatively, pass about the valve body 32a. Both embodiments are described in detail herein. In general, it is desirable that the passive passageway 36a be exposed to less than about 10% of the magnetic field strength exposed to the controllable passageway 42a. Notably, later herein, with reference to FIG. 8a and 8b, another novel embodiment will be described wherein the passive passageway is located "within" the magnetic circuit and adjacent to an area of the controllable valve exposed to a "substantial" magnetic field, yet is still operative to provide asymmetric damping.

Again referring to FIG. 1, but also referring to all other embodiments herein, an optional passive shaping passageway 41a may be added in parallel to the controllable valve 42a. This may be desirable to minimize harslhess. It may take the form of a port through the piston 24a or designed-in blow-by around the wear band 64a (See 41b of FIG. 2b).

Wire leads 31a provide the low voltage control signal (generally 12 Volt DC and electrical current of about several amps or less) from the controller 33a to the coil 46a. Optional sensor or sensors 35a may provide the appropriate input signal to the controller 33a, if needed, for feedback or other control. For example, some types of control may require only displacement information while others require displacement, acceleration, or even velocity information. It may be desirable to adaptively control the level of DC current applied based upon some time averaged sensor inputs.

Descriptions of various types of semi-active control for MR dampers, ER dampers, Semi-active (hydraulic) dampers, or the like, may be found in U.S. application Ser. No. 08/534,078 to Catanzarite entitled "Controllable Seat Damper System and Control Method Therefor" and U.S. application Ser. No. 08/639,139 to Catanzarite entitled "Control Method for Semi-Active Damper", as well as in U.S. Pat. No. 5,390,121 to Wolfe entitled "Banded On-Off Control Method for Semi-Active Dampers." Flowever, it should be understood, that the "asymmetric" damping provided by the present invention, is preferably provided in a "passive" fashion through use of the one-way check valve 34a and optional passive shaping passageway 41a in combination with the controllable passageway 42a. Resultantly, sophisticated control needs are preferably minimized or even eliminated. For example, using the various novel means for providing "asymmetry" described herein, only a DC bias current needs to be applied to the coil 46a, as opposed to the Alternating Current (AC) or a rapidly switching DC current needed for semi-active active control in prior art MR devices. This level of the DC bias may be adjusted by a user operated damping level adjustment switch 52a, dial, or the like. Notably, no "rapid" switching in real time is required to achieve the "asymmetrical" damping. It should be understood, however, in some cases, control may still be desired, such as to combat such conditions as endstop collisions (where the piston may contact either end of the damper). A useful control algorithm for reducing endstop collisions may be found in U.S. Pat. No. 5,276,622 to Miller et al.

The damper 20a is shown with a gas charged accumulator, which provides a spring component, as well as a gas charge, to the damper 20a. The accumulator includes a charge chamber 29a which is separated from second fluid chamber 30a by a slideable partition 37a, such as the slideable and sealed partition shown. Appropriate gas charging is achieved via fill valve 39a. A certain level of pressure charge (approx. 100 psi or more) is needed to combat fluid cavitation under certain damping conditions.

FIG. 2a and FIG. 2b illustrate a first embodiment of piston assembly 24b including a controllable MR valve 18b therein, and which also includes a flexure 34b interactive with the passive passageway 36b acting as the means for providing asymmetric damping. FIG. 2a is a bottom view with flexure 34b removed for clarity. As before, the piston 24b attaches to piston rod 25b and is slideable in housing 22b. The valve body 32b is made Up of a center portion 56a and an annular ring 58b, both of which are preferably manufactured from a softmagnetic material, such as low-carbon steel. Preferably, nonmagnetic welds 60b, spacers or the like (preferably 3 or four equally spaced about the top entrance of controllable passageway 42b) rigidly secure the ring 58b to the center portion 56b. A coil 46b of suitable number of winds is wound circumferentially about the center portion 56b, or about a bobbin, if two piece construction of the center portion 56b, is used. Leads 31b attach to coil 46b and exit through rod 25b, Appropriate shaft seal 62b prevents escape of MR fluid. The ring 58b and center portion 56b interact radially to form the annular-shaped controllable passageway 42b which passes through the valve body 32b.

A wear band 64b, which is preferably steel coated with the appropriate friction-reducing treatment encircles the outer periphery of ring 58b and provides the appropriate clearance between the piston 24b and housing 22b. Notably, a passive shaping passage 41b may be formed between the outer periphery of wear band 64b and the inner wall of housing 22b to allow some designed passive MR fluid flow therethrough which reduces or eliminates harshness. The passive passageway 36b is located in parallel relationship to the controllable passageway 42b and preferably comprises a plurality of holes through the valve body 32b.

The flexure 34b is preferably a disc-shaped member, manufactured from spring material which exhibits low magnetic permeability, and is secured to the center portion 56b of valve body 32b by rivet, screw, weld, adhesive, or the like. The flexure 34b is of sufficient bending (cupping) compliance to bend and open in the extension direction relative to the valve body 32b, thereby allowing a substantial amount of MR fluid to flow therethrough in the extension direction (in direction of small arrows) and providing minimal or shaped damping, in that the shaping can be designed in. Minimal adjustment is achievable in the extension direction, as the majority of flow is through the passive passageway 36b having the one-way check valve 34b. Contrarily, the level of damping may be adjusted in the compression direction based upon adjusting the DC bias to the coil 46a, via a damping level switch or appropriate computer program. Flow of MR fluid is substantially restricted through the passive passageway 36b in compression, because the flexure 34b acts as a one-way check valve in that direction, and is substantially closed. The magnetic circuit 40b in this embodiment is carried within the center portion 56b, in ring 58b, in the MR fluid within the annular controllable passageway 42b, and in the wear band 64b. Of course this assumes that the wear band 64b is manufactured form a high magnetic permeability material. Notably, the passive passageway 36b passes through the valve body 32b, yet is substantially free from exposure to the magnetic field, as it receives generally less than about 10% of the magnetic field strength, and may be as low as 1% of the field strength which is exposed to the controllable passageway 36b. Notably, the steel surrounding the passive passageways 36b will shunt any field around the passive passageway 36b rather than through it. Generally, these passive passageways 36b are high reluctance areas. Therefore, the MR fluid is substantially free to flow in the passive passageway 36b in the extension direction. Although not shown, stacks of flexures 34b could be used for providing progressive relief.

FIG. 3a and FIG. 3b illustrate a similar embodiment to FIG. 2b, except that the flexure 34c is restrained between the center portion 56c of the valve body 32c and a step formed on pistonl rod 25c. A local relief 66c may be added to equalize the flow between the various plurality of passive passageways 36c and allow ease of MR fluid flow to the outermost radial portion of the flexure 34c. Notably, this configuration of flexure 34c which is interactive with the passive passageway 36c, allows controllability in extension by restricting substantially all MR fluid through the controllable passageway 42c in extension while allowing relatively free flow in compression through the passive passageway 36c. An asymmetric damping performance curve, such as is approximated by FIG. 9b, may be achieved by such a valve construction utilizing a flexure 34c acting as a one-way check valve operative with a passive passageway 36c. This eliminates the need to rapidly switch the current to the MR valve to achieve different characteristics in compression and extension. Again, in this embodiment, the passive passageway 36c passes through the valve body 32c yet is substantially free from exposure to the magnetic field.

FIG. 4a and FIG. 4b illustrate two other embodiments of controllable MR valve assemblies 18d. 18e included within piston assemblies 24d. 24e of linear-acting dampers 20d, 20e, similar to the FIG. 3a and FIG. 3b embodiments. The difference is that, rather than including a flexure as the one-way check valve, the one-way check valve mechanism is comprised of floating discs 34d, 34e. The floating discs 34d, 34e are preferably located adjacent to an end of the passive passageway 36d, 36e and the movement of the discs 34d, 34e along the axial axis is restrained within predetermined limits by at least one selected from a group of components consisting of: a) the valve body 32d, 32e, and b) a piston rod 25e interconnected to said valve body 32e. Likewise, pins or other protrusions from the valve body 32e or piston rod 25e may be employed to limit motion of the discs 34d, 34e.

For example, referring to FIG. 4a, the floating disc 34d would be manufactured from a metal, plastic, other polymer material, or combinations thereof, and would be free to move (float) within gap 68d formed between the valve body 32d and the retainer 70d. The retainer 70d includes several radially-protruding tabs 72d formed thereon to limit excessive axial downward movement of disc 34d. In the extension direction, the disc 34d will rest against tabs 72d and flow of the MR fluid will be about the disc 34d exiting between the disc 34d and valve body 32d. Contrarily, during the compression stroke, the disc 34d will move vertically and seal off the passive passageways 36d.

Disc 34e in FIG. 4b operates in substantially the same fashion, except it floats between the step in piston 25e and the valve body 32e. Notably, this embodiment allows controlled damping in extension and substantially free flow (low damping) in compression, as opposed to the FIG. 4a embodiment, which allows controllable damping in compression and substantially free flow in extension. Notably, in both embodiments, the passive passageways 36d, 36e pass through the valve body 32d, 32e yet are substantially free from exposure to the magnetic field.

FIGS. 5a, 5b, 6a, and 6b illustrate several embodiments of controllable valves 18f, 18g included within piston assemblies 24f, 24g of linear-acting dampers 20f, 20g. In particular, the embodiment described in FIG. 5a and 5b was reduced to practice. In each of these embodiments, the passive passageways 36f, 36g are situated around, and flow "about", the valve body 32f, 32g, and are closed off in the compression direction by one-way check valve mechanisms comprising slideable annular members 34f, 34g. The annular members 34f, 34g are located adjacent to, and encircle, a radial outer periphery of the valve bodies 32f, 32g and are interactive with the valve bodies 32f, 32g to control flow of the MR fluid through the passive passageways 36f, 36g. The annular members 34f, 34g are restrained within predetermined limits by lip portions 74f, 74f', 74g, 74g' formed on, and protruding radially from, the valve bodies 32f, 32g.

The one-way check valve mechanism is accomplished by allowing flow between the rings 74f, 74g of valve bodies 32f, 32g and the annular members 34f, 34g in one direction and substantially closing off flow in the other. Flow in the extension direction is allowed in the passive passageways 36f, 36g by having the passageways 36f, 36g at least partially formed by one selected from a group of relieves consisting of: a) a relief 66f formed in the annular member 34f, and b) a relief 66g formed in the valve body 32g. In FIG. 5a, 5b, each of the relieves 66f in the annular member 34f comprise a square, rectangular, semicircular-shaped, or other wise contoured slot formed in the bottom axial edge of the annular member 34f. Preferably, a plurality of radially-spaced slots are used. In the FIG. 6a, 6b embodiment, the relief 66g is comprised of a spline plunged into the valve body 32g. Likewise, preferably, a plurality of radially-spaced splines are employed. The splined relief 66g only extends part way across the radial peripheral surface of the ring 58g.

For example, FIG. 6a illustrates the position of the annular member in the compression direction. The annular member 34g is located in sealed engagement with the lip 74g, covering recess 66g and, thereby, substantially restricting MR fluid flow in compression through the passive passageway 36g. Contrarily, FIG. 6b illustrates the annular member 34g in the other terminal position, during the extension stroke, whereby the passive passageway 36g is opened up and MR fluid may flow about the valve body 32g. Likewise, FIG. 5a illustrates the annular member 34f in the position during the compression stroke, where the flow of MR fluid is cut off by annular member 34f contacting lip 74f. In extension (FIG. 5b) the flow of MR fluid is substantially unrestricted and MR fluid is substantially free to flow through passive passageway 36f and through slot relief 66f.

In each of these embodiments FIG. 5a–FIG. 6b, controllable flow is allowed in compression, and substantially free flow is permitted in extension, thereby providing a controllable damping force (which may range from a high value to a low value depending upon electrical current supplied to the coil) in compression and a low damping force in extension. It should be understood, that this relationship may be reversed by simply reversing the orientation of the annular member 34f in FIG. 5a, and by cutting the relieves 66g into the upper portion of valve body 32g in the FIG. 6a embodiment instead of the lower portion. In each of these embodiments including an annular member 34f, 34g, the coil 46f, 46g, and the magnetic circuit 40f, 40g are preferably oriented such that the passive passageways 36f, 36g are substantially free from exposure to the magnetic field.

FIGS. 7a and 7b illustrate another embodiment of controllable valve 18h included within piston assembly 24h of a linear-acting damper 20h. In this embodiment, the passive passageway 36h passes through the valve body 32h and includes a one-way check valve which takes the form of a spring-loaded poppet 34h. Preferably, the poppets 34h are spaced on a circular pattern inside the preferably annular controllable passageway 42h. The poppet 34h comprises spring 43h and poppet body 45h which seals in tapered opening in passive passageway 36h. Preferably, there are a plurality of radially-spaced passive passageways 36h and a plurality of spring-loaded poppets 34h interactive therewith, to close off flow of MR fluid in the extension direction. Preferably, the controllable passageway 42h comprises an annular-shaped member and the magnetic field is located and oriented such that the poppets 34h and passive passageway 36h are not exposed to any substantial magnetic field. Preferably, the poppet body 45h and spring 43h would be nonmagnetic.

Figures 8A, 8B:
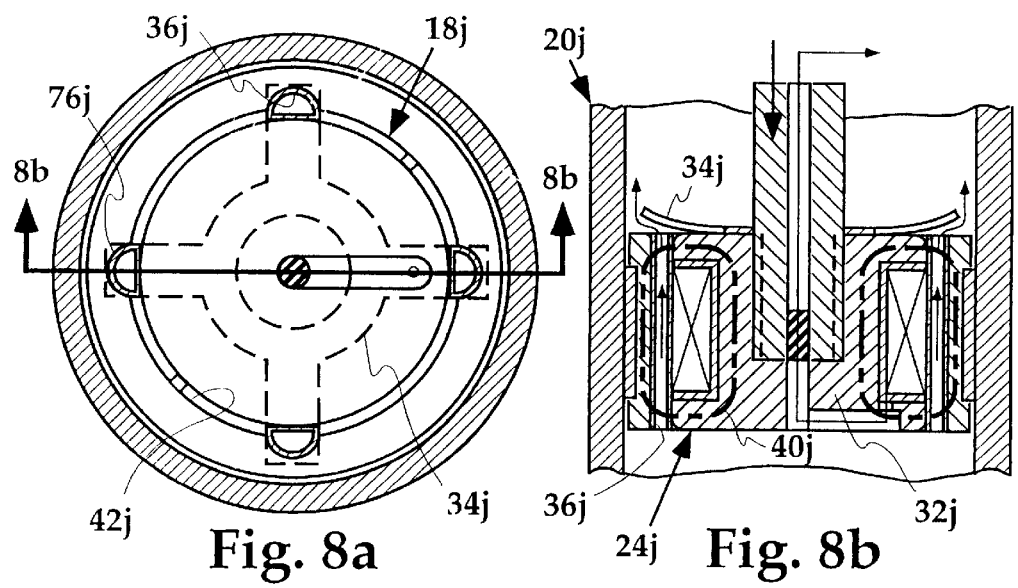
FIG. 8a and FIG. 8b illustrate bottom, and cross-sectioned side views, respectively, of a piston assembly of a MR linear damper which includes a controllable valve assembly with a reed-type one-way check valve.

FIGS. 8a and 8b illustrate another embodiment of controllable valve 18j included within piston assembly 24j of a MR linear-acting damper 20j. In this embodiment, the passive passageways 36j has a one-way check valve interactive therewith, which takes the form of a reed-type valve 34j. Preferably, there are a plurality of reed valves 34j and a plurality of radially-spaced passive passageways 36j. The means for providing "asymmetric" damping, in this embodiment, comprises a passive passageway 36j arranged in parallel relationship to the controllable passageway 42j. The passive passageway 36j includes a one-way check valve operative therewith for substantially restricting flow of the MR fluid in a first flow direction (ex. extension) through the passive passageway 36j associated with movement of the piston assembly 24j in a first direction, yet allowing substantial flow of MR fluid in a second flow direction (ex. compression) associated with movement of the piston assembly 24j in a second direction. In contrast to the previous embodiments, the passive passageway 36j is situated "within" the magnetic circuit 40j, such that the passive passageway 36j could receive substantial exposure to said magnetic field, as does the controllable passageway 42j. However, flux will avoid the passive passageways 36j because they represent larger reluctance as compared to the controllable passageways 42j.

In more detail, preferably, the passive passageways 36j are separated from the controllable passageway 42j via partition means, such as partition tube 76j. The tube 76j is inserted and separates the passive passageway 36j from the controllable passageways 42j along the length of the valve body 32j. The dimensions of the passive passageway 36j are preferably substantially larger than the controllable passageway 42j. By way of example, the dimensions of the annular controllable passageway 42j might be between about 0.02 in to 0.06 in (0.5 mm to 1.5 mm) while the dimensions of the passive passageway 36j would be between about 0.08 in to 0.20 in (2 mm to 5 mm). By making the passive passageway 36j preferably much larger, the flux density (localized field strength) therein is significantly reduced, thereby, reducing substantially the rheology change experienced therein, and allowing substantially free flow of MR fluid through the passive passageway 36j in the unchecked direction (compression) even though the passive passageway is situated "within" the magnetic circuit.

Figures 9A, 9B:
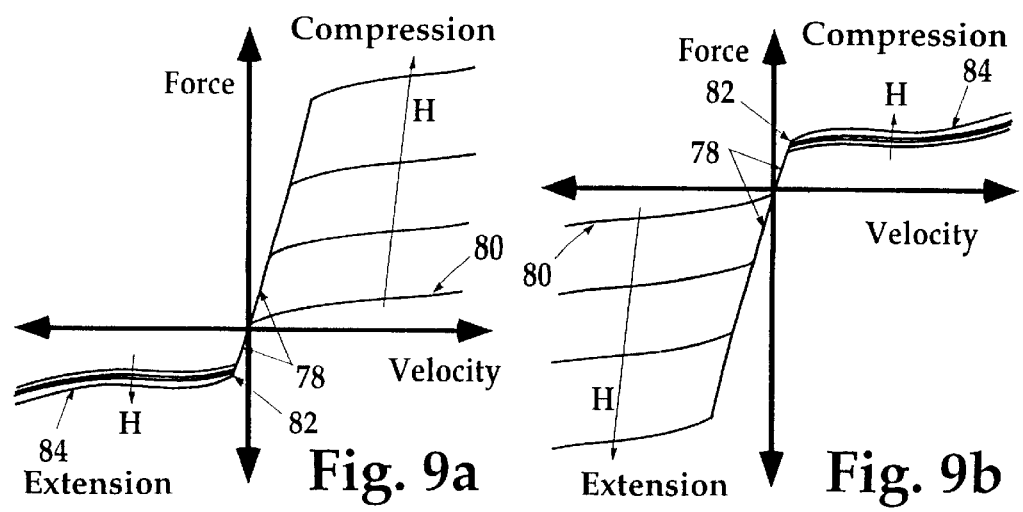
FIG. 9a and FIG. 9b illustrate approximated performance curves for the controllable valve assemblies incorporating a one-way check valve.

FIG. 9a and FIG. 9b illustrate approximate Force v. Velocity performance curves for the controllable valve assemblies before described. Alternatively, these may be thought of as pressure-flow profiles. In the case where controllability in compression is desired, FIG. 9a illustrates the approximated profile. The slope or character of the low velocity region 78 (occurring at low fluid flow velocities) is dictated by the passive shaping passageway. If there is fluid inertia associated with this orificing/passageway, it will play a more important role at higher velocities. Otherwise, the effect of this orificing/passageway will be seen at all velocities. In other words, a fluid inertia can be designed into the passive shaping passageway to limit its effects at higher velocities.

The slope or character of the controlled region 80 is largely dictated by the viscosity of the MR fluid and the nature (shape, length, entrances, etc.) of the MR controlled passageway. The overall level of damping may be varied from a low value to a high value H, depending upon the current supplied to the coil. The family of curves shown is illustrative of four different applied currents, from zero current to maximum current.

The force at which break point 82 occurs is largely dictated by the parameters of the one-way check valve (ex. the thickness and stiffness of the flexure disks 34b, 34c (FIG. 3a and 3b) and the level of prestressing of the disks 34b, 34c, the gap 68d in the FIG. 4a embodiment, the dimensions between lips 74f, 74f'' and lips 74g, 74g' and dimensions of slot relieves 66f or spline relieves in the FIG. 5a–6b embodiments, the characteristics of poppet 34h, i.e., shape, stiffness, etc. in the FIG. 7a, 7b embodiment, and the dimensions of passive passageway 36j and stiffness/ prestressing of reed valve 34j in the FIG. 8a, 8b embodiment. The character of flow relief region 84 is dictated by the nature of the orificing/passive passageway, stiffness characteristics of one-way check valves and MR fluid properties (viscosity, exposure to magnetic field, etc.).

FIGS. 10a, 10b and 11 illustrate another embodiment of controllable valve 18k, 18m within a piston assemblies 24k, 24m of a MR device, such as the linear-acting MR dampers 20k and 20m. The piston assemblies 24k, 24m act a partitions subdividing the internal cavities 26k, 26m into a first fluid chamber 28k, 28m and second fluid chamber 30k, 30m. The means for providing "asymmetric" damping in controllable valves 18k, 18m comprises providing a "changeable gap" within said controllable passageways 42k, 42m whose dimension (gap thickness) is variable as a function of the flow direction of the MR fluid between first and second chambers 28k, 28m and 30k, 30m. As will become apparent, the controllable valve assembly 18k, 18m may be used singly, or within a MR linear damper or MR mounting.

In particular, a spring 84k, 84m preferably causes spring loading of a wall portion 86k, 86m of the controllable passageways 42k, 42m which allows the wall portion 86k, 86m to move as a function of flow direction and, thus, vary the gap dimension associated with the controllable passageways 42k, 42m as a function of flow direction. Providing a spring-loaded wall portion 86k, 86m causes the changeable gap dimension (ex. tg) to be larger in a first flow direction (ex. compression shown in FIG. 10b) and smaller in a second flow direction (ex. extension shown in FIG. 10a) and, resultantly, produce more restricted flow of the MR fluid 44k, 44m in the second direction (ex. extension) than in the first direction (ex. compression). This creates higher damping forces in the first flow direction than in the second flow direction.

In the FIG. 10a and FIG. 10b embodiment, the spring 84k is a coil-type spring which provides a spring force between cup 58k and shaft 25k. The c-clip 88k maintains the appropriate precompression of the spring 84k and forces the cup 58k into intimate contact with nonmagnetic spacer 73k, 73m between cup 58k and center portion 56k. In the compression direction, the cup 58k moves relative to the center portion 56k, axially. This causes the gap thickness tg to get larger. As a result, the damping forces fall off significantly, as the magnetic reluctance of the magnetic circuit 40k contained in the piston assembly (partition) 24k, 24m increases. This is because the magnetic circuit's reluctance is strongly affected by the gap thickness tg. Moreover, the larger gap thickness tg also changes the hydraulic lever and reduces drag thereby further amplifying the effect. By varying the angle θ, the degree of difference in damping in compression and extension may also be adjusted. It should be understood that the current to coil 46k, 46m generates the magnetic field in magnetic circuit 40k, 40m, and that that current is generally constant, but may vary between a min and max level to adjust the damping level in the controlled direction. Changing the gap thickness tg changes the circuit reluctance as a function of flow direction, therefore, providing "asymmetry" in damping. In the FIG. 11 embodiment, the spring loading of wall portion 86m is provided by a flexure 84m.

The cup 58*m* is preferably spot welded to the shaft 25*m*. This embodiment operates substantially as described with reference to FIG. 10*a*, 10*b*, except that the spring loading is provided by flexure 84*m*. It should be understood that the magnetic circuits 40*k*, 40*m* are oriented such that magnetic body forces between the cup 58*k*, 58*m* and center portions 58*k*, 58*m* are minimized.

Figures 12A, 12B, 12C:
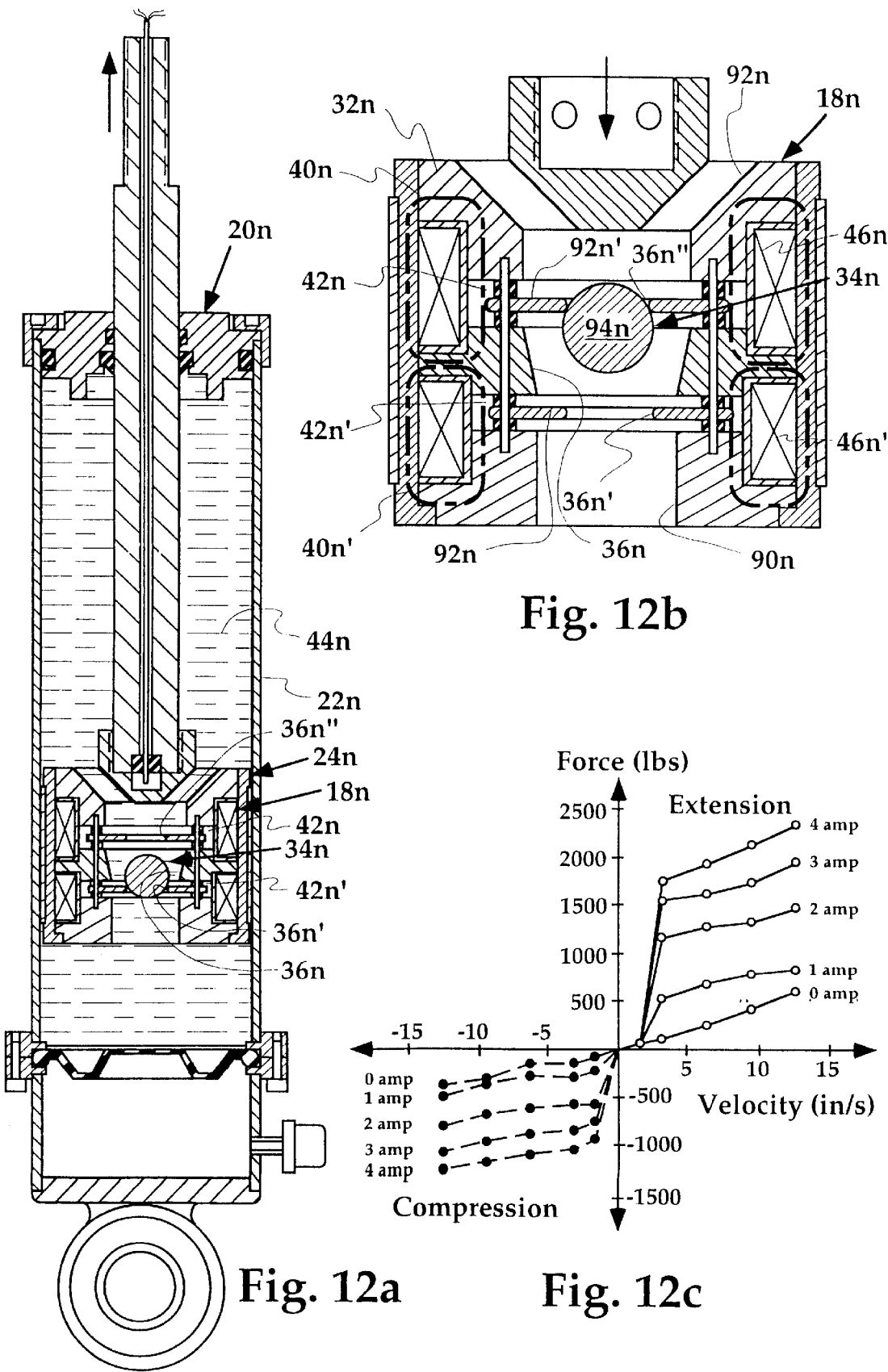
FIG. 12c illustrates a Force versus Velocity performance curve illustrating actual measured performance data of the MR single-tube linear damper of FIG. 12a including the controllable MR valve assembly of FIG. 12b.

FIG. 12*a* and 12*b* illustrate an embodiment of damper 20*n* and controllable valve assembly 18*n* that was reduced to practice experimentally. The damper 20*n* is a single tube linear-acting MR damper (linear referring to providing damping forces being generated along a linear axis) which includes a piston assembly 24*n* having a controllable valve assembly 18*n* received within housing 22*n*. In this embodiment, the controllable valve assembly 18*n* includes a first controllable passageway 42*n* for controlling flow of the MR fluid 44*n* in a first flow direction (compression) and a second controllable passageway 42*n*' for controlling flow in a second flow direction (extension). A passive passageway 36*n* including a ball valve 34*n* operative therewith comprising a one-way check valve is arranged in parallel relationship with the particular controllable passageway 42*n*, 42*n*' that is "operative" for that flow direction.

For example, as shown in FIG. 12*a*, the ball valve 34*n* operative with the passive passageway 36*n* closes off the lower passive passageway 36*n*' (as shown), such that the MR fluid 44*n* is forced to flow through the second controllable passageway 42*n*'. Flow through the upper passive passageway 36*n*" is substantially unrestricted. Likewise, as shown in FIG. 12*b*, when the damper is in compression, the ball valve 34*n* closes off the upper passive passageway 36*n*" (as shown) and the MR fluid is forced to flow through the first controllable passageway 42*n*. It is notable that the controllable passageways 42*n*, 42*n*' and the passive passageways 36*n*', 36*n*" preferably share at least a common ingress 90*n* into the valve body 32*n*, and may also share a common egress 92*n* from the valve body 32*n*. The controllable passageways 42*n*, 42*n*' pass about baffle plates 92*n*, 92*n*' for exposing more of the MR fluid to the magnetic flux, as illustrated by magnetic circuits 40*n*, 40*n*'. The ball valve 34*n* comprises a spherical ball 94*n* which seals in seats formed in the baffle plates 92*n*, 92*n*'. FIG. 12*c* illustrates actual test data of the performance of the damper 20*n* of FIG. 12*a*. This dual-coil embodiment has some key advantages. For small deflections, the ball floats to provide a "null band." When the "null band" is exceeded, the ball 94*n* seats in seat formed in baffle plate 92*n*, 92*n*'. Then the proper DC bias may be commanded to provide the appropriate controlled damping in each flow direction.

Each of the previous embodiments are soft in a first direction and stiff in a second for all conditions. This embodiment departs from that scenario by allowing the damper to be stiff in a first direction, and soft in the second for most conditions, yet when a high level of damping is required in the second direction, the level of damping may be increased. This higher level of damping in the second direction may be desirable for reacting to transient or other conditions. The dual controllable passageways 42*n*, 42*n*' comprise one acting to control flow in a first direction, and another controlling flow in a second direction. This particular embodiment is particularly well suited for implementing semi-active "skyhook" control in suspension systems with vastly simplified control and sensor requirements as compared to prior art systems. FIG. 12*c* illustrates that in extension, the family of performance curves shown are achievable by applying DC bias to coil 46*n*', thereby generating a magnetic flux which acts upon the MR fluid in the second controllable passageway 42*n*'. Likewise, in compression, the family of performance curves shown are achieved by applying DC bias to coil 46*n*, thereby generating a magnetic flux which acts upon the MR fluid in the first controllable passageway 42*n*. Notably, the passive passageways 36*n*, 36*n*', 36*n*" are preferably located "outside" of the magnetic circuits 40*n*, 40*n*', such that they are not exposed to any substantial magnetic fields.

Figure 13:
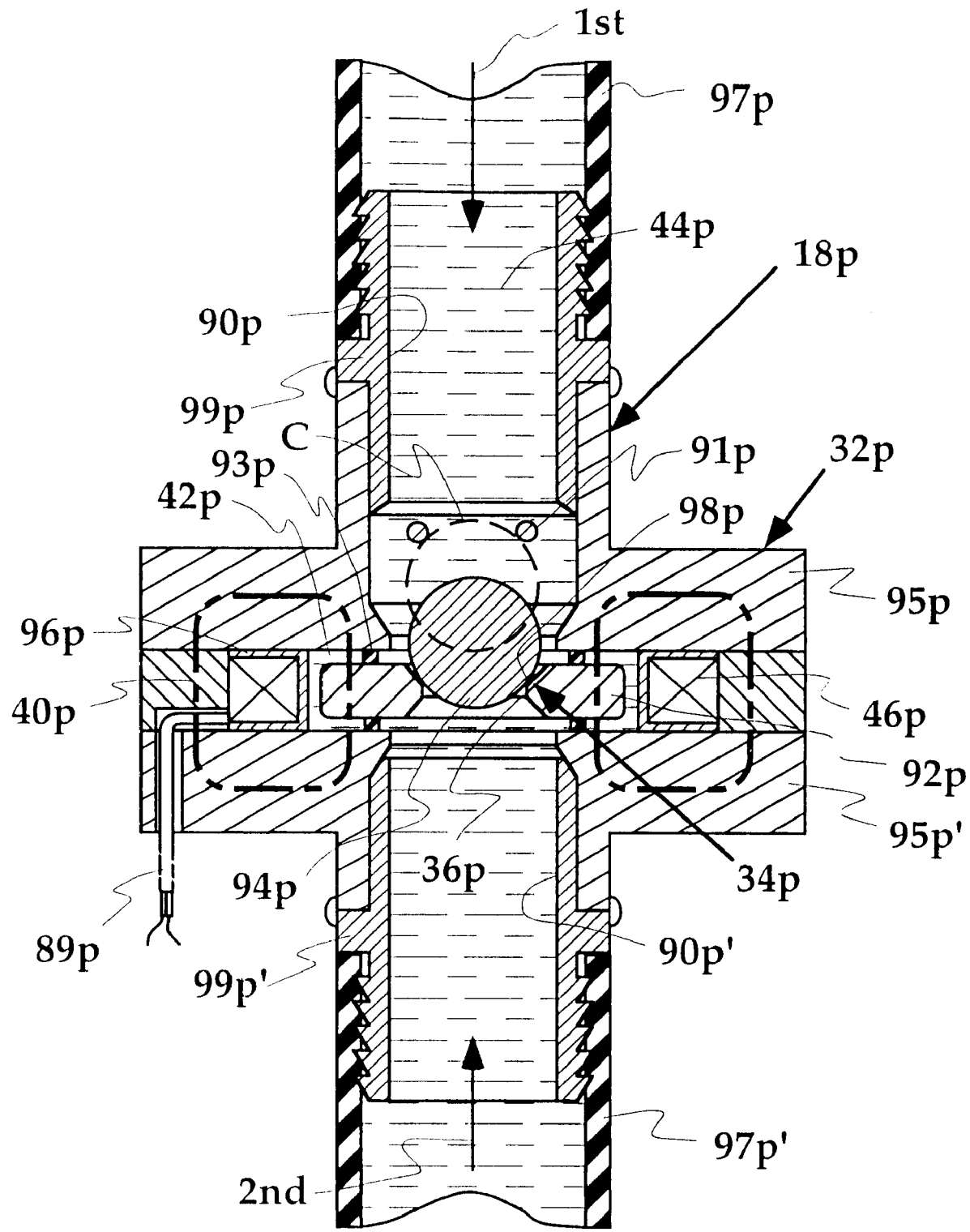
FIG. 13 illustrates a cross-sectional side view of a MR controllable valve assembly including a ball-type one-way check valve.

FIG. 13 illustrates a controllable valve assembly 18*p* of the two-way acting type (designed to accommodate MR fluid flow in both directions), which comprises a valve body 32*p* having at least a portion of a magnetic circuit 40*p* contained therein, the magnetic circuit which is capable of carrying a magnetic flux $\phi$, a controllable passageway 42*p* adjacent to the valve body 32*p* and, preferably, passing through it. The controllable passageway 42*p* is located within the magnetic circuit 40*p* and exposed to the magnetic flux $\phi$ generated by the magnetic field generator (coil 46*p*). A MR fluid 44*p* is contained in the controllable passageway 42*p*, and also in the ingress and egress ports 90*p*, 90*p*'. A magnetic flux generator, which is preferably the aforementioned coil 46*p*, is formed by wrapping a magnet wire circumferentially about a bobbin 96*b*. The generated magnetic flux $\phi$ is carried by the magnetic circuit 40*p* and is directed by pole pieces 95*p*, 95*p*' to act through the MR fluid 44*p* contained in the controllable passageway 42*p*. This generates the rheology changes in the MR fluid 44*p* within said controllable passageway 42*p*, thereby restricting flow of MR fluid 44*p* through the controllable passageway 42*p*.

Figure 14A:
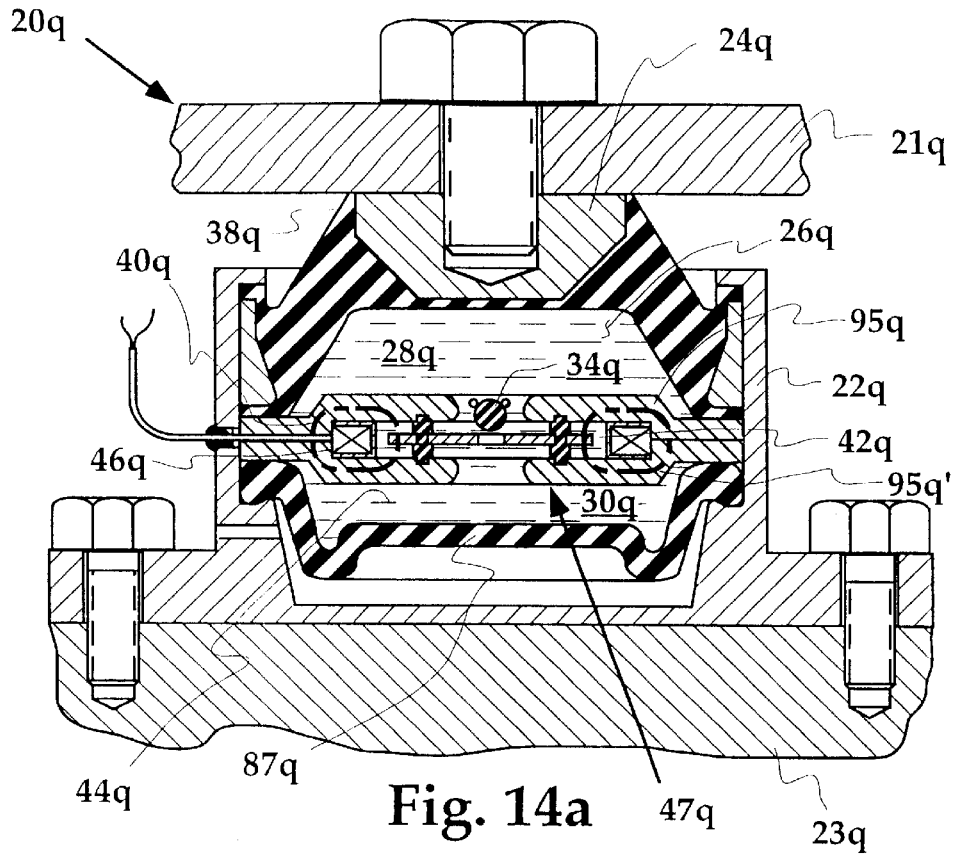
FIG. 14a and FIG. 14b illustrate cross-sectional side views of several MR fluid mountings including controllable MR valve assemblies with one-way check valves.

The means for providing "asymmetric" damping across said controllable valve assembly 18*p* and, thereby, creating a higher pressure differential across the controllable valve 18*p* in a first flow direction (1st), and a lower pressure differential in a second flow direction (2nd), without rapidly controlling the magnetic flux $\phi$ within the magnetic circuit 40*p* comprises a one-way check valve, such as a ball valve 34*p*. As a result, higher damping forces are created in the first flow direction (1st) and lower damping forces in said second flow direction (2nd). It should be readily apparent that this same configuration of valve 18*p*, which includes the ball-type check valve 34*p* may be used in a MR fluid mounting and a MR linear damper as well, as are illustrated in FIG. 12*a* and FIG. 14*a*. In more detail, in this embodiment, a stationarily-mounted baffle plate 92*p* is secured between pole pieces 95*p*, 95*p*' by preferably non-magnetic puck-shaped spacers 93*p*. The spacers 93*p* locate and secure the baffle plate 92*p*, yet do not appreciably restrict the flow of the MR fluid 44*p*, and do not appreciably affect the magnetic circuit 40*p*.

The controllable passageway 42*p* passes "about" the baffle plate 92*p* for exposing more of the MR fluid 44*p* to the magnetic flux $\phi$ contained in the magnetic circuit 40*p*. The ball valve 34*p* comprises a preferably spherically-shaped ball 94*p*, a circular-shaped seat 98*p* formed in the baffle plate 92*p*, and means for restraining movement of the ball 34*p* within limits, such as pins 91*p*. The ball valve 34*p* is operative with the passive passageway 36*p* is closed off by the ball 34*p* when MR fluid 44*p* is flowing in the first direction (1st), thereby, forcing the MR fluid 44*p* through the controllable passageway 42*p*, where the damping level, i.e., the level of restriction, may be adjusted between substantially unrestricted flow and substantially no flow depending upon the amount of electrical current supplied to leads 89*p*. Contrarily, when the MR fluid 44*p* is flowing in the second direction (2nd), the ball 34*p* moves to the position indicted by the dotted circle C, and flow of MR fluid 44*p* is substantially unrestricted through the passive passageway 36p. Flow though the controllable passageway 42p in the second direction (2nd) is generally restricted, as there is generally always a DC bias applied. Notably, even when no DC bias is applied, the flow resistance through the passive passageway 36p is generally somewhat less than that of the controllable passageway 42p such that the majority of flow is through the passive passageway 36p. Preferably, end connectors 99p, 99p' are used to connect to the hoses 97p, 97p' of the system where the valve 18p is used to control flow. It should be noted, that in this embodiment, the passive passageway 36p passes through the valve body 32p and is located "outside" the magnetic circuit 40p such that the fluid in the passive passageway 36p is not exposed to any substantial amount of magnetic flux φ.

Figure 14B:
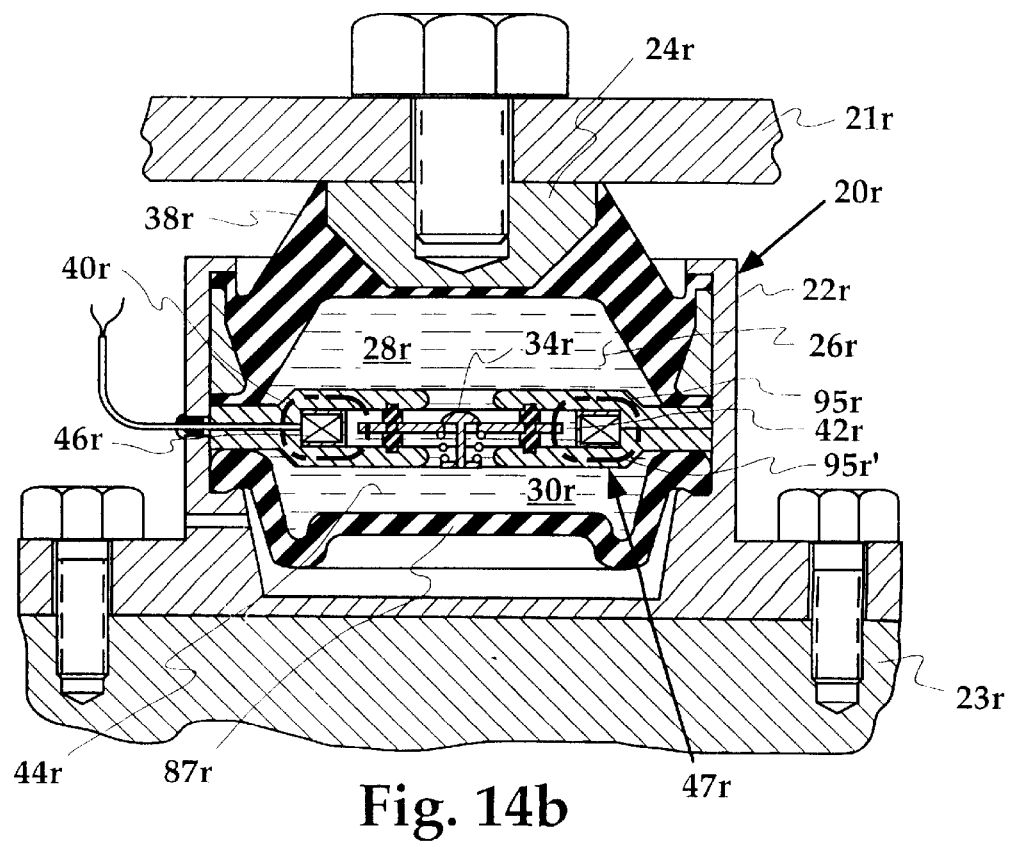

FIG. 14a and 14b illustrate several embodiments of MR fluid mountings 20q, 20r which are capable of providing "asymmetric" damping without having to rapidly switch the current to the coil, as required in prior art MR fluid mountings. The controllable MR fluid mountings 20q, 20r comprise a housing member 22q, 22r, an inner member 24q, 24r, a flexible member 38q, 38r interconnecting between said inner member 24q, 24r and said housing 22q, 22r, means for interconnecting the inner member 24q, 24r to a first moveable member 21q, 21r (such as an engine or engine bracket), and means for connecting the housing 22q, 22r to a second moving member 23q, 23r (such as a chassis or frame). An internal cavity 26q, 26r housed within said mounting 20q, 20r is subdivided by a divider 47q, 47r into first fluid chambers 28q, 28r and second fluid chambers 30q, 30r.

A controllable passageway 42q, 42r which is capable of controllable flow is operative between the first fluid chambers 28q, 28r and second fluid chambers 30q, 30r. A MR fluid 44q, 44r substantially fills the controllable passageways 42q, 42r, first chambers 28q, 28r, and second chambers 30q, 30r. The magnetic circuit 40q, 40r is preferably substantially contained within the divider 47q, 47r and is capable of carrying the magnetic flux which is generated by magnetic flux generators, such as coils 46q, 46r. The coils 46q, 46r are located adjacent to the dividers 47q, 47r for generating a magnetic flux which is carried by magnetic circuits 40q, 40r and which are directed by pole pieces 95q, 95q' and 95r, 95r' to act upon the MR fluid 44q, 44r within the controllable passageway 42q, 42r.

The means for providing "asymmetric" damping comprises a one way check valve, such as a ball valve 34q, or spring-loaded poppet 34r, where a pressure differential between the first chamber 28q, 28r and the second chamber 30q, 30r in a first flow direction (compression) is higher than a pressure differential in a second flow direction (extension). This is accomplished passively, without having to rapidly control (switch) the flux φ in the magnetic circuits 40q, 40r. In each of these embodiments a low stiffness diaphragm 87q, 87r partially defines the second chamber 30q, 30r. Further descriptions of MR fluid mountings may be found in commonly assigned U.S. Pat. No. 5,398,197 to J. D. Carlson et al.

Figure 15A:
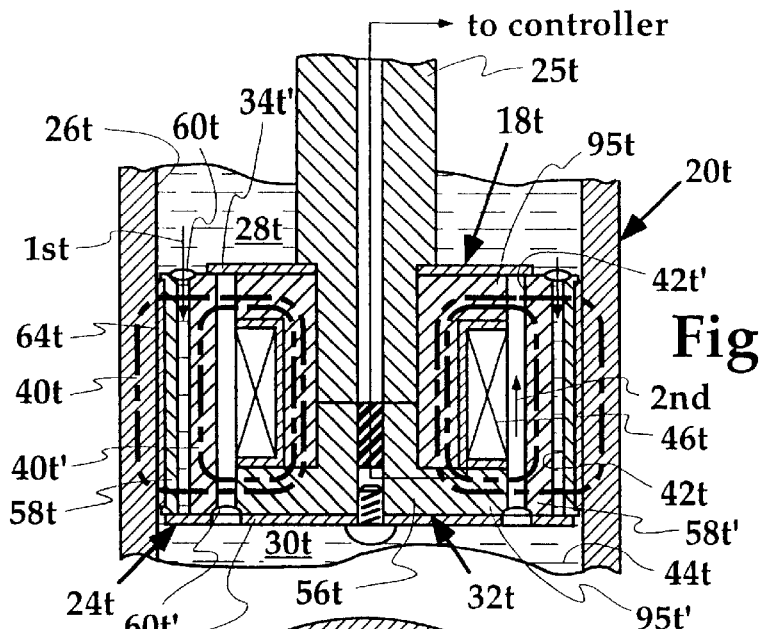
FIG. 15a–15c illustrates a cross-sectional side view, a bottom view, and a top view, respectfully, of another controllable MR valve assembly in an MR linear damper which includes a first annular controllable passageway for flow in a first direction and a second concentric annular controllable passageway for flow in a second direction.
Figure 15B:
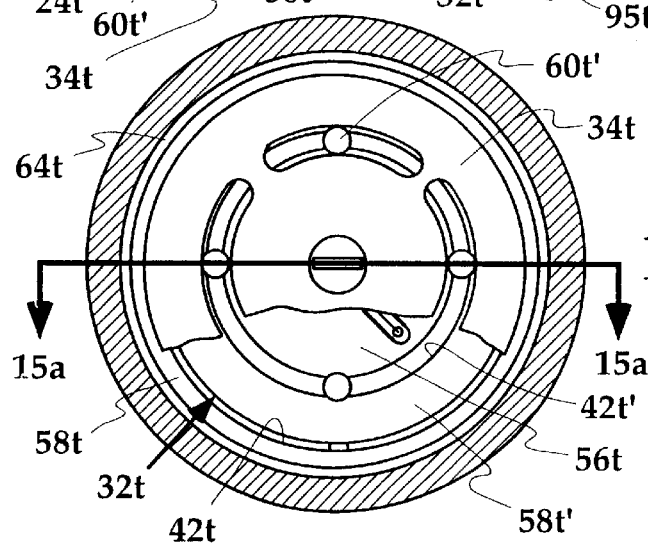
Figure 15C:
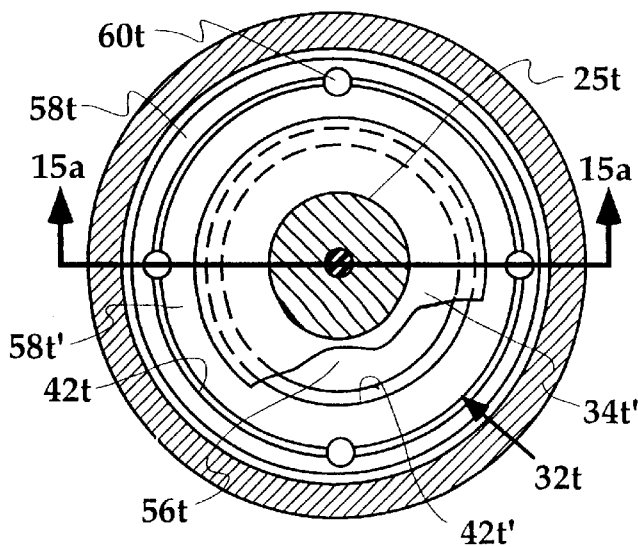

FIG. 15a–15c illustrate another configuration of controllable valve 18t which finds application in an MR device, such as a linear-acting MR damper 20t. Likewise, the construction of valve 18t, described herein may be adapted for use in a MR fluid mounting. The controllable damper 20t is comprised of an internal cavity 26t, a partition, such as a piston assembly 24t, or the like, subdividing the internal cavity 26t into a first fluid chamber 28t and a second fluid chamber 30t. A "first" controllable passageway 42t which is capable of controllable flow is interconnected between the first fluid chamber 28t and the second fluid chamber 30t. A "second" controllable passageway 42t', which is also capable of controllable flow, is also interconnected between the first fluid chamber 28t and the second fluid chamber 30t. A MR fluid 44t is contained in first controllable passageway 42t, second controllable passageway 42t', first chamber 28t, and second chamber 30t. A first magnetic circuit 40t, preferably having a first (higher) reluctance, is contained within the piston assembly 24t (partition), and is capable of carrying a first magnetic flux. Likewise, a second magnetic circuit 40t', preferably having a second (lower) reluctance, is contained in the piston assembly 24t (partition), and is capable of carrying a second magnetic flux. A magnetic flux generator, in the form of a single wound coil 46t, is located adjacent to the piston assembly 24t (partition) and generates the first and second magnetic flux φ, φ' which are carried by the first and second magnetic circuits 40t, 40t'. These fluxes φ, φ' are directed by pole pieces 95t, 95t' to act upon the MR fluid 44t contained in the first and second controllable passageways 42t, 42t'. It should be noted that a single coil 46t generates both of the magnetic fluxes φ, φ' within magnetic circuits 40t, 40t'. Controllability is provided by adjusting the DC bias to coil 46t to control flow therein.

A first one-way check valve 34t is operative with said first controllable passageway 42t, thereby providing "asymmetric" damping as a function of flow direction, by allowing flow in a first direction 1st, and substantially restricting flow in a second flow direction 2nd within the controllable passageway 42t. A second one-way check valve 34t' is operative with the second controllable passageway 42t', and provides "asymmetric" damping as a function of flow direction, by allowing flow in the second flow direction 2nd and substantially restricting flow in the first flow direction 1st. The check valves 34t, 34t' preferably comprise spring-type flexures, which are preferably disc shaped. The first check valve 34t is preferably secured to valve body 32t by a appropriate means, such as a screw, weld, adhesive, or the like. Formed in check valve 34t are spaced-apart slot segments which allow a substantial flow of MR fluid 44t through the second controllable passageway 42t' in a second flow direction 2nd. Likewise, second check valve flexure 34t' is secured to valve body 32t by a step on piston rod 25t.

The novelty in this embodiment lies in the combination of a first controllable passageway 42t for allowing controlled damping in a first direction 1st and a second controllable passageway 42t' allowing controlled damping in a second direction 2nd. Notably, both the first and second passageways 42t, 42t' are acted upon by a "common" magnetic field generated by a "common" coil 46t. The reluctance of magnetic circuits 40t, 40t' are preferably different, thereby providing less resistance to flow of MR fluid 44t in one flow direction than in the other.

In this embodiment, the piston assembly 24t is constructed from a annular outer ring 58t, an annular inner ring 58t', and a center portion 56t, all of which are preferably manufactured from magnetically-soft material, such as low carbon steel. Preferably, nonmagnetic welds 60t interconnect outer ring 58t and inner ring 58t'. Likewise preferably, nonmagnetic welds 60t' interconnect the inner ring 58t and the center portion 56t. The check valve flexures 34t, 34t', which are interactive with controllable passageways 42t, 42t', are preferably manufactured from suitable spring-steel material, or the like, and are of the appropriate stiffness to provide the appropriate damping characteristics. Optional wear bands 64t, which preferably include a friction reducing surface treatment, are in sliding contact with the housing 22t of the single-tube linear MR damper 20t. Although, flexures are shown, many of the other one-way check valves described herein could also be adapted.

FIG. 16a–b illustrates another embodiment of valve assembly 18v, which utilizes a valve similar to that described with reference to FIG. 11. The main difference is that the valve 18v is configured as a stand alone in FIG. 16a for controlling MR fluid flow between any two fluid chambers. The FIG. 17 embodiment is another MR mounting 20w incorporating the type of valve described with reference to FIG. 16a. The elements in valve 18v are similar to the FIG. 13 embodiment, except that the means for providing "asymmetry" is provided by a moveable wall portion 86v which is moveable, in a generally axial direction, relative to pole pieces 95v, 95v', and moveable as a function of flow rate and flow direction. The bullet-shaped magnetic return 92v is flexibly suspended relative to the valve body 32v, and is manufactured of suitable soft-magnetic material, and functions to complete the magnetic circuit 40v. The spring 84v preferably takes the form of a nonmagnetic flexural spider, as is shown in FIG. 16b, and has a plurality of spring elements 85v. Additionally, an extra spring similar to spring 84v may be positioned, and secured, at the other end of magnetic return 92v for stabilizing any sideways movement. Flow in the direction shown by the arrow causes MR fluid 44v to move the return 92v in the downward direction relative to the pole pieces 95v, 95v', thereby increasing the gap thickness tg. This quickly increases the reluctance of the magnetic circuit 40v and, thereby, lowers the MR effect causing less of a restriction of the MR fluid 44v. Conversely, in the other flow direction (opposed to arrow shown), the MR effect is increased, thereby, increasing the flow resistance. The angle imposed on the outer surfaces of return 95v and inner surfaces of pole pieces 95v, 95v' may be adjusted to provide more variation in the two flow directions. However, it is desirable to keep the angle shallow to reduce magnetic body forces acting between the pole pieces 95v, 95v' and the magnetic return 92v.

In the MR mounting 20w of FIG. 17, a similar preferably nonmagnetic spring 84w suspends the magnetic return 92w relative to pole pieces 95w, 95w'. Flow from first chamber 28w into second chamber 30w causes a wider gap and, therefore, less of a rheology change in the MR fluid 44w in the controllable passageway 42w. Likewise, flow from second chamber 30w to first chamber sees a enhanced MR effect because of the narrower gap, thereby providing increased damping relative to the compression stroke, i.e., the valve 18w provides "asymmetric" damping. Alternatively, the spring 84w could be manufactured from radially spaced segments of elastomer bonded between the magnetic return 92w and divider 47w.

Figure 18A:
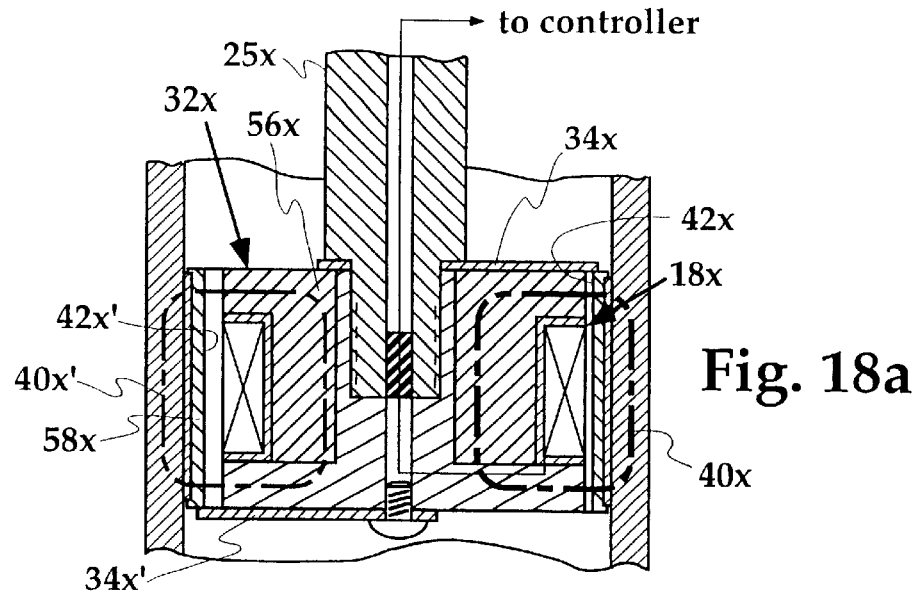
FIG. 18a–18c illustrates a cross-sectional side view, a top view, and a bottom view, respectfully, of a MR linear damper which includes a plurality of controllable passageway segments.
Figure 18B:
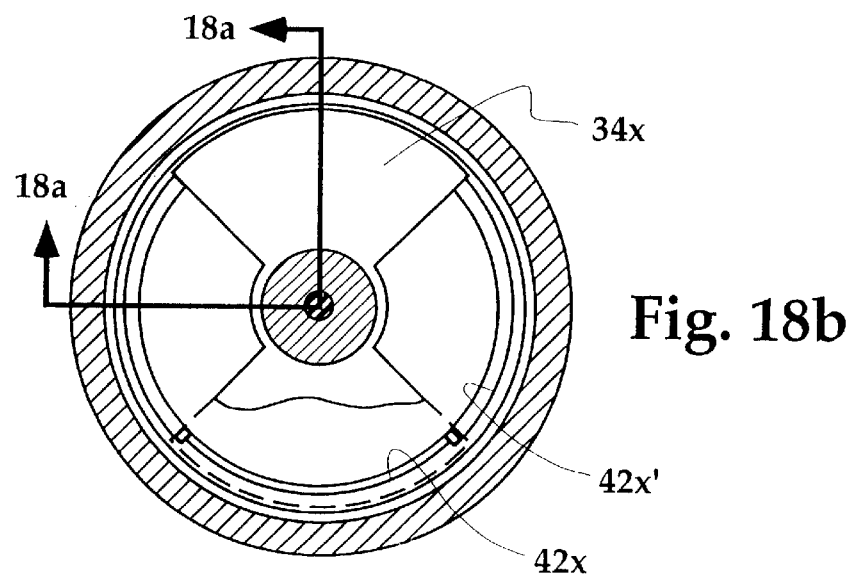
Figure 18C:
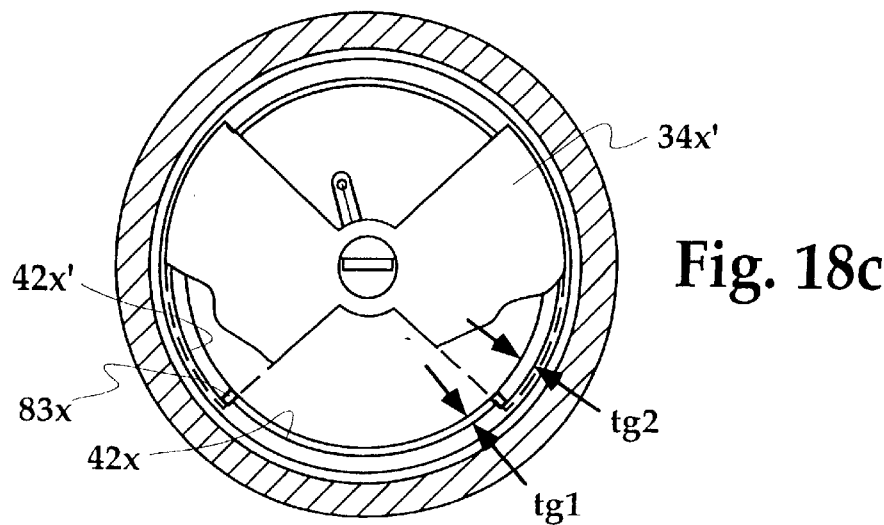

FIG. 18a–c illustrates another embodiment similar to that described with reference to FIGS. 15a–c. However, in this embodiment, the controllable passageways 42x, 42x' are both formed between the outer ring 58x and the center portion 56x. The dimensional thickness tg1, tg2 of controllable passageways 42x, 42x' are different, thereby providing a different magnetic reluctance for the magnetic circuit acting upon each. For example, the first magnetic circuit 40x acting upon the first controllable passageway 42x has a first magnetic reluctance, while the second magnetic circuit 40x' acting on second controllable passageway 42x' has a preferably higher reluctance. One-way check valves 34x, 34x' are interactive with each of the controllable passageways 42x, 42x', and substantially restrict flow of MR fluid in one direction through each controllable passageway 42x, 42x', and allow flow in the opposite direction.

Notably, check valve 34x allows flow in compression through passageway 42x, while check valve 34x' allows flow through passageway 42x' in extension. Contrarily, check valve 34x cuts off flow of MR fluid through first controllable passageway 42x in extension, and check valve 34x' cuts off flow through passageway 42x' in compression. Preferably, one-way check valves 34x, 34x' comprise butterfly-shaped flexures which block substantially all of each of the passageways 42x, 42x' on one end thereof. Passageways 42x, 42x' are formed by differing thickness annular sections formed on ring 58x which interact with the outer periphery of the center portion 56x. Segments 83x extend from the bottom to the top of valve body 32x. Segments 83x are preferably nonmagnetic and prevent flow between the first controllable passageway 42x and the second controllable passageway 42x' in the circumferential direction. Check valve 34x is preferably secured to valve body 32x by step on piston rod 25x. Likewise, check valve 34x' is preferably secured to valve body 32x by fastener, welding, adhesive, or the like. The valve assembly 18x provides "asymmetric", yet tunable damping in both directions of the damper 20w. Notably, it should be recognized that this valve's configuration could be used in a MR fluid mounting or in a stand alone control valve.

Figure 19A:
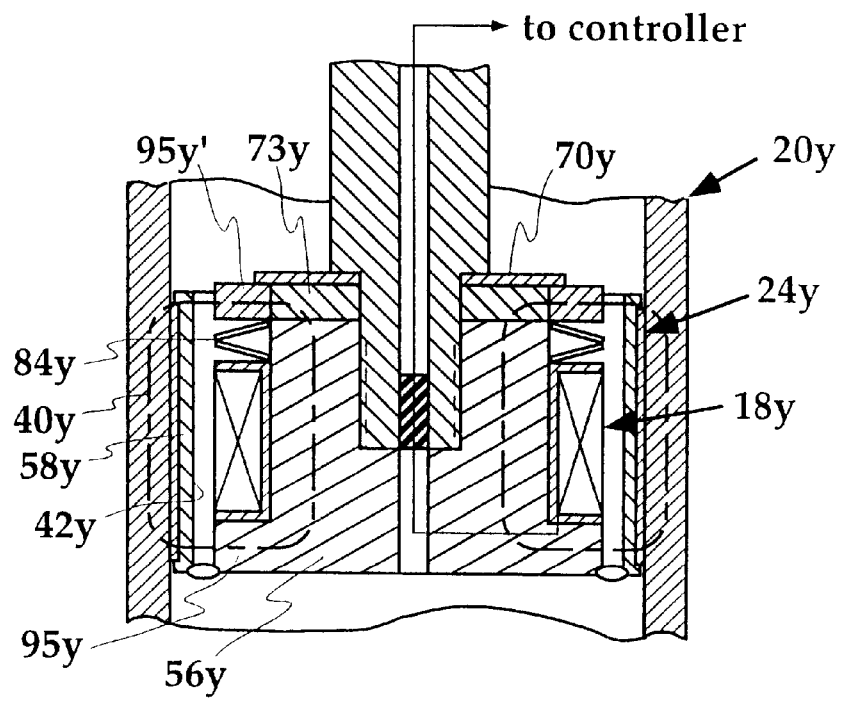
FIG. 19a and 19b illustrate cross-sectional side views of a MR linear damper which includes an annular controllable passageway with a sliding pole piece which provides varying magnetic circuit reluctance as a function of flow direction.
Figure 19B:
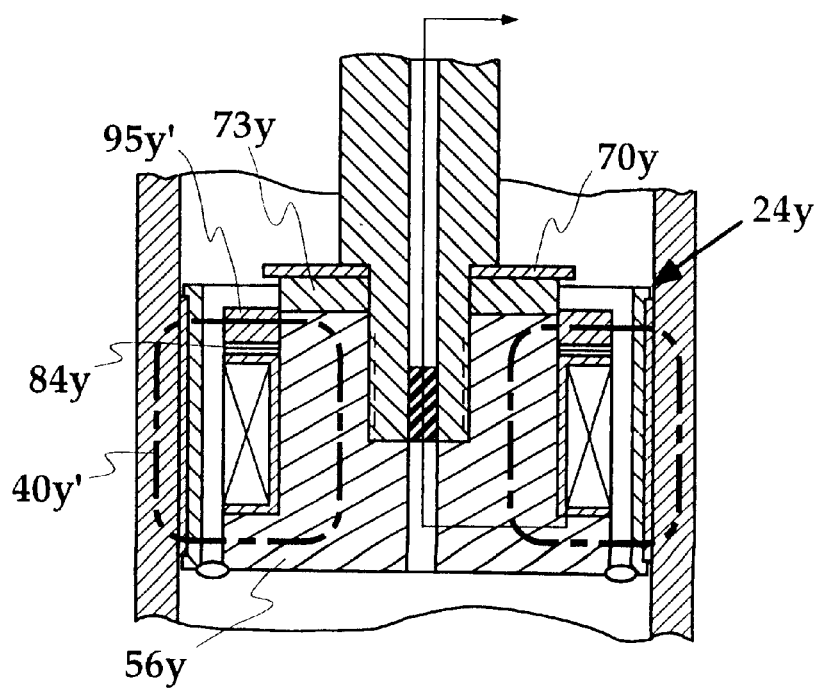

FIG. 19a–b illustrates two positions of a valve assembly 18y which finds utility in linear-acting MR damper 20y. The valve assembly 18y includes an annular outer ring 58y which interacts with the center portion 56y which includes pole pieces 95y, 95y' to form the controllable passageway 42y. The valve 18y includes a spring 84y, such as the multiple Belleville springs shown, which flexibly support the pole piece 95y'. Depending upon the direction of travel of the piston assembly 24y, the pole piece 95y is either in the upper position, as shown by FIG. 19b (ex. in compression) or in the lower position, as shown in FIG. 19b (ex. in extension). When the pole piece 95y' is positioned in the upper position (FIG. 19a), the magnetic circuit 40y has high reluctance, and thus, a low force is produced in compression. This lower force is produced because the magnetic circuit reluctance is high because preferably annular-shaped nonmagnetic spacer 73y is present within the magnetic circuit 40y (the weak magnetic strength indicated by the thinner dotted line).

However, when the piston is stroked in extension, the pole piece 95y' axially compresses spring 84y, which aligns the pole piece 95y' (which is manufactured from a soft-magnetic material) with the center portion 56y and, therefore, the magnetic short circuit is removed and the magnetic circuit 40y' exhibits lower reluctance, and, thus, higher force is produced in extension. Preferably, a disc-like nonmagnetic retainer 70y prevents the pole piece 95y' from moving too far. It should be understood that the motive force which urges the pole piece 95y' to move from the "upper" to the "lower" position is pressure acting upon the face of the pole piece 95y'. It also should also be recognized that the means for providing "asymmetry" is a magnetic circuit reluctance which is varied as a function of flow direction. The reluctance varies from a "high" value in the upper position to a "low" value in the lower position, and may provide many intermediate reluctance values depending upon the pressure acting on the face of pole piece 95y'.

Figure 20:
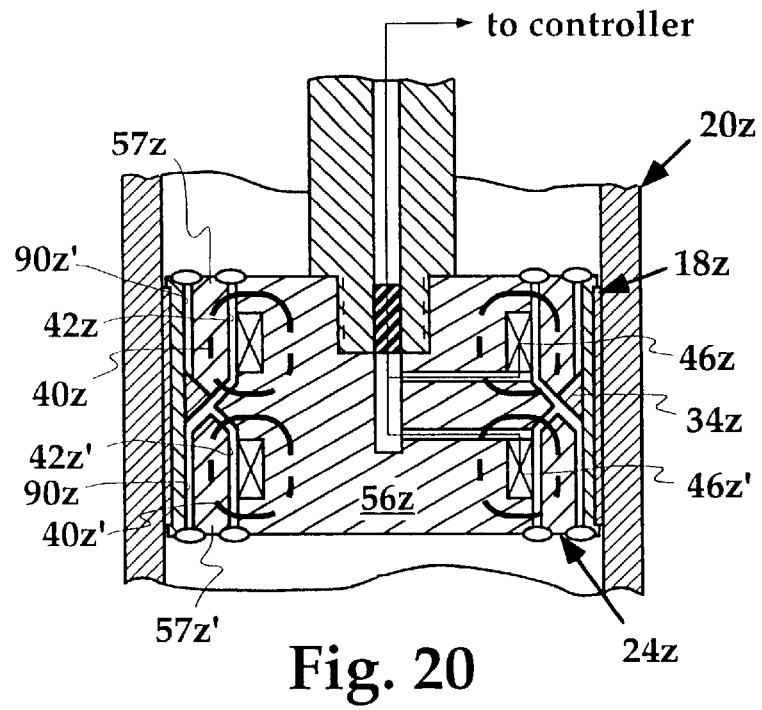
FIG. 20 illustrates a cross-sectional side view of a MR linear damper which includes multiple controllable passageways and dual coils.

FIG. 20 illustrates another valve assembly 18z within a piston 24z of linear-acting MR damper 20z. This embodiment includes dual coils 46z, 46z' each generating a magnetic field which acts upon different controllable passageways 42z, 42z'. One way valves 34z which takes the form of a ring-like sliding member with a triangular cross-sectional area operates to force flow through controllable passageway 42z in compression and force flow through controllable passageway 42z' in extension. Similar to the FIG. 12a embodiment, the current to coils 46z, 46z' are independently adjustable and preferably receive a DC bias, which may be different. Further the reluctance of the magnetic circuits $40z$, $40z'$ may be different. Notably, during the compression stroke, flow is generally in through ingress $90z$ and out through the first controllable passageway $42z$, as the DC bias prevents any substantial flow through second controllable passageway $42z'$. Check valve $34z$ is in intimate contact with upper intermediate ring $57z$ thereby closing off ingress $90z'$. Likewise, in extension, flow is in through ingress $90z'$ and out through second controllable passageway $42z'$. Check valve $34z$ is in intimate contact with lower intermediate ring $57z'$ thereby closing off ingress $90z$. Welds secure outer ring $58z$, intermediate rings $57z$, $57z'$, and center portion $56z$ together.

Figure 21:
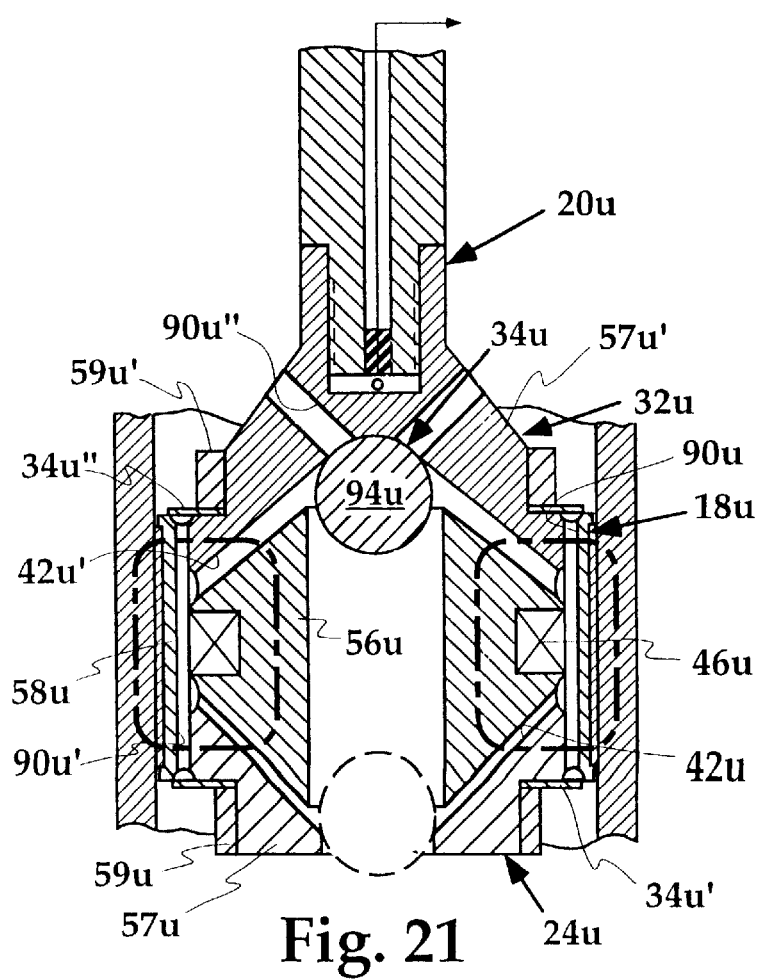
FIG. 21 illustrates a cross-sectional side view of a MR linear damper which includes multiple controllable passageways and a single coil.

FIG. 21 illustrates another valve assembly $18u$ within the piston $24u$ in linear-acting MR damper $20u$. This embodiment includes a plurality of controllable passageways $42u$, $42u'$ and a single coil $46u$. In compression operation, ball $94u$ of one-way check valve $34u$ closes off the plurality of ingress ports $90u''$ and fluid flows in through first controllable passageway $42u$ and out through egress $90u$. Flow in egress $90u'$ is blocked off by flexure-type one-way check valve $34u'$. In extension, the ball $94u$ moves to the position shown in dotted lines and flow is in through ingress ports $90u''$ through second controllable passageway $42u'$ and out through egress $90u'$. Flow through first controllable passageway $42u$ is blocked by ball $94u$. Flow through egress $90u$ is blocked by flexure-type one-way check valve $34u'$. Preferably, the reluctance of the magnetic field acting on the first controllable passageway $42u$ and the second controllable passageway $42u'$ is different. This is preferably accomplished by making the dimension of the first controllable passageway $42u$ smaller than the second controllable passageway $42u'$ such that damping force in extension is higher than in compression. Thie valve body $32u$ is comprised of annular ring $58u$, center portion $56u$, and end poles $57u$, $57u'$. The flexure discs $34u'$, $34u''$ are secured to ends $57u$, $57u'$ by nuts $59u$, $59u'$. Ring $58u$, center portion $56u$, and end poles $57u$, $57u'$ are secured together via welds or the like.

In summary, its should be recognized from the foregoing that the present invention is a controllable MR valve assembly which finds application alone, in MR dampers, or in MR mountings. The MR valve assembly is two-way acting (designed to accommodate flow in two directions) and provides for passively obtained damping "asymmetry", i.e., a higher damping force in a first flow direction, and a lower damping force in a second flow direction. Various means for providing the "asymmetrical" damping are described herein, such as: 1) providing one or more passive passageways with a "one-way check valve" operative therewith which are located in parallel relationship to the controllable passageway, or 2) providing a "changeable flow gap" via a moveable wall portion in the controllable passageway, or 3) providing a "first controllable passageway" for flow in a first direction and a "second controllable passageway" for flow in a second direction, or 4) providing means for varying the "magnetic reluctance" of the magnetic circuit as a function of flow direction, such as by having a "high magnetic reluctance section" which is toggled into, and out of, the magnetic circuit as a function of flow direction.

While several embodiments including the preferred embodiment of the present invention have been described in detail, various modifications, alterations, changes, and adaptations to the aforementioned may be made without departing from the spirit and scope of the present invention defined in the appended claims. It is intended that all such modifications, alterations, and changes be considered part of the present invention.

We claim:

1. A two-way controllable magnetorheological fluid valve assembly, comprising:

(a) a valve body having at least a portion of a magnetic circuit contained therein which is capable of carrying a magnetic flux, (b) a controllable passageway adjacent to said valve body in a vicinity of said magnetic circuit, (c) a Magnetorheological fluid contained in said controllable passageway, (d) a magnetic flux generator for generating a magnetic flux which is carried by said magnetic circuit and which is directed to act upon said magnetorheological fluid in said controllable passageway to provide controllable rheology changes to said magnetorheological fluid in said controllable passageway thereby restricting flow through said controllable passageway, and (e) a passive passageway arranged in parallel relationship to said controllable passageway, said passive passageway having a one-way check valve fluidically operative therewith so as to substantially restrict flow in a first flow direction and allow flow in a second flow direction, said passive passageway being situated with said magnetic circuit, yet a dimension of said passive passageway is large enough relative to a comparable dimension of said controllable passageway such that said magnetorheological fluid passing through said passive passageway does not exhibit any significant rheology change.

2. A two-way controllable valve assembly, comprising:

(a) a valve body having a high reluctance magnetic circuit and a low reluctance magnetic circuit contained therein, said high and low reluctance magnetic circuits capable of carrying a low and a high magnetic flux, respectively, (b) first and second controllable passageways adjacent to said valve body, (c) a Magnetorheological fluid contained in said first and second controllable passageways, (d) a magnetic flux generator for generating said high and low magnetic flux which are carried by said high and low reluctance magnetic circuits and which are directed to act upon said magnetorheological fluid in said first and second controllable passageways to provide controllable rheology changes therein, and (e) a first one-way check valve operative with said first controllable passageway substantially restricting flow in a first flow direction and allowing flow in a second flow direction, and (f) a second one-way check valve operative with said second controllable passageway substantially restricting flow in said second flow direction and allowing flow in said first flow direction.

3. A two-way controllable valve assembly, comprising:

(a) a valve body having at least a portion of a magnetic circuit contained therein which is capable of carrying a magnetic flux, (b) a controllable passageway adjacent to said valve body in a vicinity of said magnetic circuit, (c) a Magnetorheological fluid contained in said controllable passageway, (d) a magnetic flux generator for generating a magnetic flux which is carried by said magnetic circuit and which is directed to act upon said magnetorheological fluid in said controllable passageway to provide controllable rheology changes to said magnetorheological fluid ill said controllable passageway thereby restricting flow through said controllable passageway, and (e) means for interjecting a magnetic short into and out of said magnetic circuit as a function of flow direction in said controllable passageway thereby causing a high magnetic circuit reluctance when said magnetic short is in said magnetic circuit, thus a lower damping force, and a low magnetic reluctalnce when said magnetic short is out of said magnetic circuit, thus a higher damping force.

* * * * *